(12) United States Patent
Li et al.

(10) Patent No.: US 11,780,287 B2
(45) Date of Patent: Oct. 10, 2023

(54) THERMAL MANAGEMENT SYSTEM AND ELECTRIC VEHICLE HAVING THE SAME

(71) Applicant: GUANGZHOU AUTOMOBILE GROUP CO., LTD., Guangzhou (CN)

(72) Inventors: Xiaohui Li, Sunnyvale, CA (US); Qin Yang, Sunnyvale, CA (US); Bozhi Yang, Sunnyvale, CA (US)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 98 days.

(21) Appl. No.: 17/357,674

(22) Filed: Jun. 24, 2021

(65) Prior Publication Data

US 2022/0410653 A1 Dec. 29, 2022

(51) Int. Cl.
*B60H 1/00* (2006.01)
*B60H 1/32* (2006.01)

(52) U.S. Cl.
CPC ..... *B60H 1/00278* (2013.01); *B60H 1/00035* (2013.01); *B60H 1/00485* (2013.01); *B60H 1/00907* (2013.01); *B60H 1/323* (2013.01); *B60L 2240/425* (2013.01)

(58) Field of Classification Search
CPC ............ B60H 1/00278; B60H 1/00035; B60H 1/00485; B60H 1/00907; B60H 1/323; B60H 1/00885; B60H 1/00921; B60H 1/322281; B60H 1/0005; B60H 2001/00307; B60K 1/00; B60L 2240/425; Y02T 10/70
See application file for complete search history.

(56) References Cited

U.S. PATENT DOCUMENTS

| | | | |
|---|---|---|---|
| 11,130,385 B2* | 9/2021 | Boger | B60H 1/3208 |
| 11,207,939 B2* | 12/2021 | Johnston | B60H 1/00885 |
| 11,548,349 B2* | 1/2023 | Li | B60H 1/3208 |
| 2019/0375270 A1* | 12/2019 | Boger | B60H 1/00392 |
| 2020/0047591 A1* | 2/2020 | He | B60H 1/32284 |
| 2022/0314735 A1* | 10/2022 | Pinto | B60H 1/08 |
| 2022/0410653 A1* | 12/2022 | Li | B60H 1/00278 |

FOREIGN PATENT DOCUMENTS

| | | | | |
|---|---|---|---|---|
| CN | 110576717 A | | 12/2019 | |
| CN | 111251802 A | * | 6/2020 | ......... B60H 1/00278 |
| EP | 3419843 B1 | * | 11/2022 | ......... B60H 1/00278 |
| WO | 2021009318 A1 | | 1/2021 | |
| WO | WO-2022242374 A1 | * | 11/2022 | ......... B60H 1/00278 |
| WO | WO-2023073309 A1 | * | 5/2023 | |

* cited by examiner

*Primary Examiner* — Ljiljana V. Ciric
(74) *Attorney, Agent, or Firm* — ScienBiziP, P.C.

(57) ABSTRACT

A thermal management system includes a refrigerant loop, a battery coolant loop, and a motor coolant loop. The refrigerant loop includes a compressor selectively communicating with at least two of a condenser, an evaporator, and a heat exchanger. The battery coolant loop includes a first bypass path connected to the heat exchanger. The motor coolant loop includes a second bypass path connected to the radiator. A valve package includes ten outer ports and eight inner channels. Three outer ports connect to the heat exchanger, one of which is connected to the first bypass path. Two outer ports connect to the power supply system. Two outer ports connect to the powertrain system. Three outer ports connect to the radiator, one of which is connected to the second bypass path. Eight of the ten outer ports selectively communicate with four of the eight inner channels.

20 Claims, 30 Drawing Sheets

THERMAL MANAGEMENT SYSTEM AND ELECTRIC VEHICLE HAVING THE SAME

FIELD

The subject matter herein generally relates to a thermal management system and an electric vehicle having the thermal management system.

BACKGROUND

An electric vehicle operates by a motor receiving electricity from a battery and outputting power. Electric vehicles discharge very little carbon dioxide and generate very little noise. Motors of the electric vehicles generally have energy efficiencies higher than those of internal combustion engines.

However, driving ranges of electric vehicles may be reduced in cold weather. Therefore, there is room for improvement in the art.

BRIEF DESCRIPTION OF THE DRAWINGS

Implementations of the present disclosure will now be described, by way of embodiment, with reference to the attached figures.

DETAILED DESCRIPTION

Implementations of the disclosure will now be described, by way of embodiments only, with reference to the drawings. It should be noted that the embodiments and the features of the present disclosure can be combined without conflict. Specific details are set forth in the following description to make the present disclosure to be fully understood. The embodiments are only portions of, but not all the embodiments of the present disclosure. Based on the embodiments of the present disclosure, other embodiments obtained by a person of ordinary skill in the art without creative efforts shall be within the scope of the present disclosure.

Unless defined otherwise, all technical and scientific terms used herein have the same meaning as commonly understood by one of ordinary skill in the art. The terms used herein in the specification of the present disclosure are only for describing the embodiments and are not intended to limit the present disclosure. The term "and/or" as used herein includes any combination of one or more related items.

Figure 1:
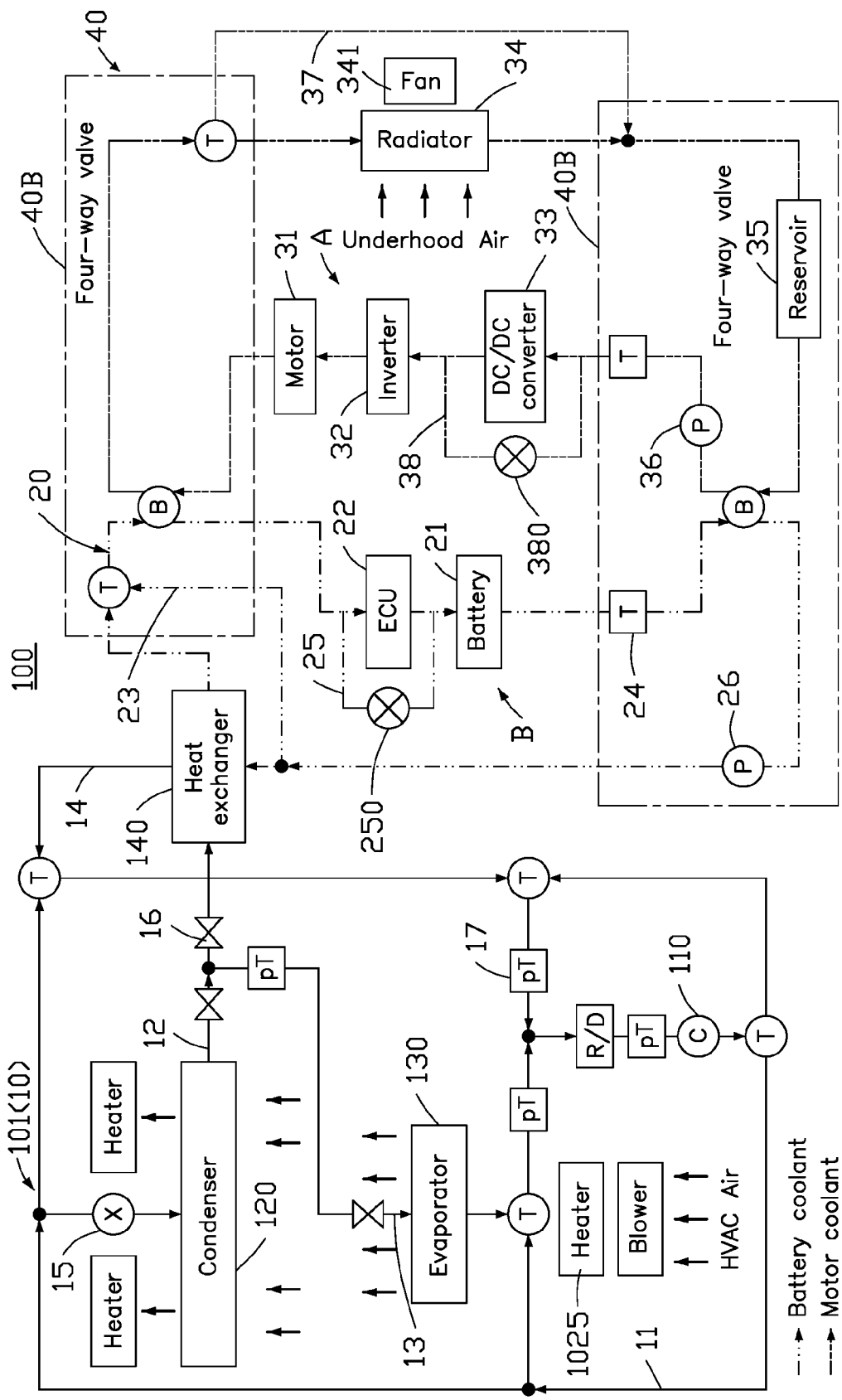
FIG. 1 is a diagrammatic view of a thermal management system according to an embodiment of the present disclosure.
Figure 2:
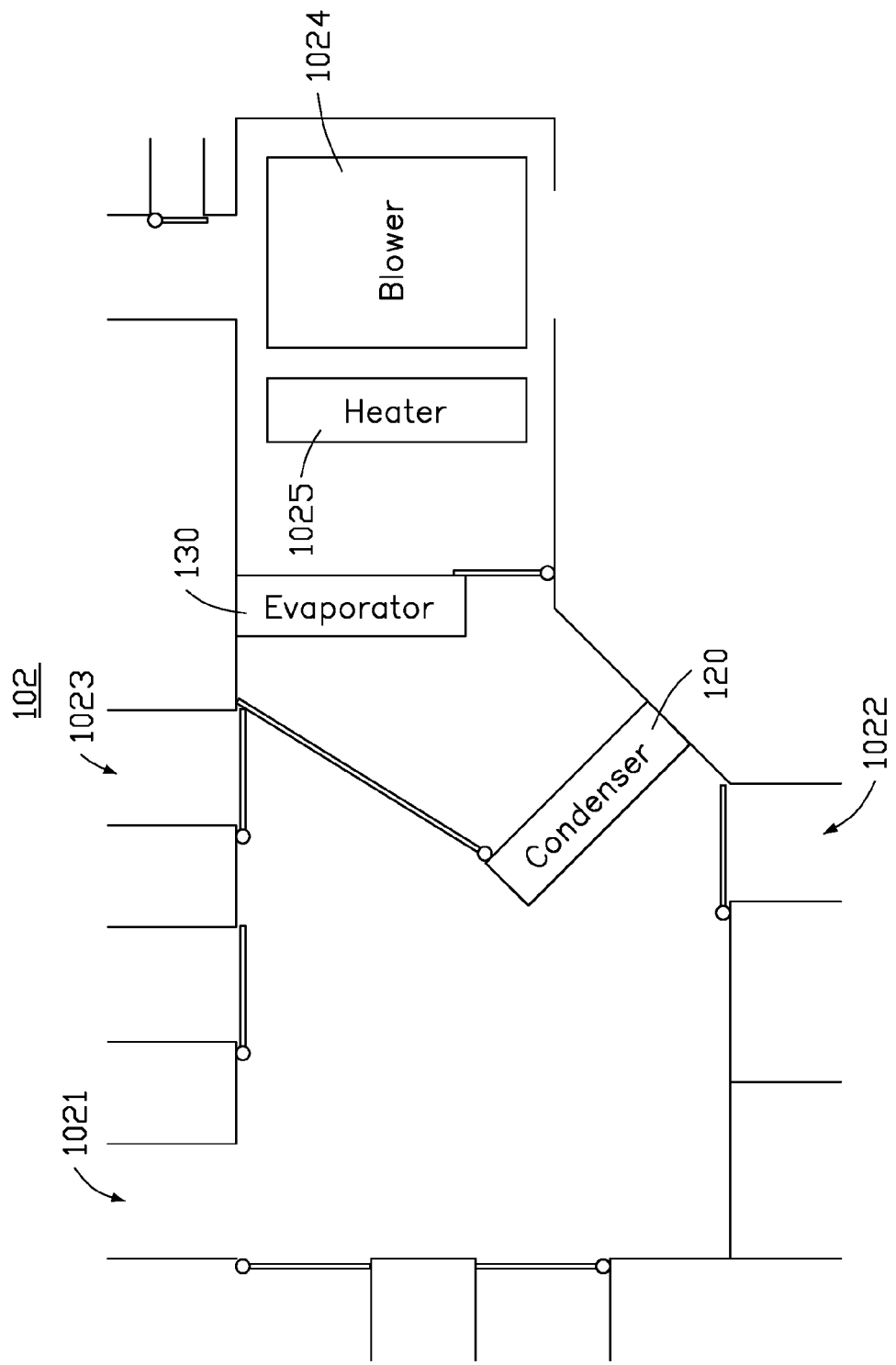
FIG. 2 is a diagrammatic view of an HVAC box of the thermal management system of FIG. 1.
Figure 27:
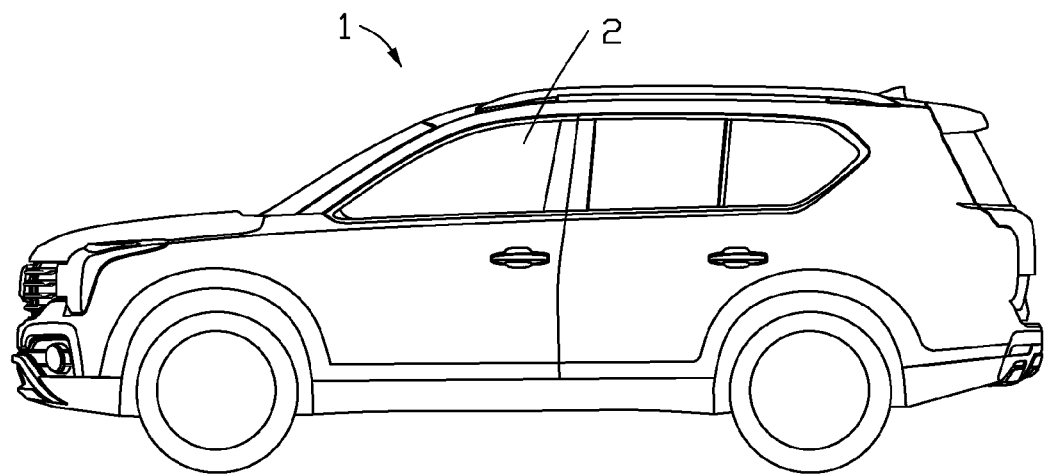
FIG. 27 is a diagrammatic view of an electric vehicle according to the present disclosure.

FIGS. 1 and 2 illustrate an embodiment of a thermal management system 100, which can be applied in an electric vehicle 1 (shown in FIG. 27). The thermal management system 100 includes a heat pump air conditioning system 101 and a Heating, Ventilation and Air Conditioning (HVAC) box 102.

The heat pump air conditioning system 101 includes a refrigerant loop 10. The refrigerant loop 10 includes a main line 11, a first branch 12, a second branch 13, and a third branch 14. The main line 11 includes a compressor 110 that can compress refrigerant. The first branch 12 includes a condenser 120 that can condense the refrigerant and release heat. The second branch 13 includes an evaporator 130 that can evaporate the refrigerant and absorb heat. The third branch 14 includes a heat exchanger 140 that can function as an evaporator or a condenser. The thermal management system 100 further includes a battery coolant loop 20 and a motor coolant loop 30. The heat exchanger 140 can also exchange heat with a coolant flowing through the battery coolant loop 20 and the motor coolant loop 30.

The HVAC box 102 can be disposed in front of the passenger cabin 2 (shown in FIG. 27). The condenser 120 and the evaporator 130 are disposed in the HVAC box 102, and the warm air from the condenser 120 or the cold air from the evaporator 130 can be released to the passenger cabin 2 or ejected to the ambient environment. In at least one embodiment, the HVAC box 102 includes a first air vent 1021 communicating the condenser 120 with the passenger cabin 2, a second air vent 1022 communicating the evaporator 130 with the ambient environment, and a third air vent 1023 communicating the evaporator 130 with ambient environment. The warm air from the condenser 120 can be released to the passenger cabin 2 through the first air vent 1021, or ejected to the ambient environment through the second air vent 1022. The cold air from the evaporator 130 can be ejected to the ambient environment through the third air vent 1023.

In at least one embodiment, the HVAC box 102 further includes a blower 1024. The blower 1024 can blow the air inside the HAVX box 102 to the passenger cabin 2 or the ambient environment, thus facilitating air flows from the HAVX box 102 to the passenger cabin 2 or the ambient environment.

Referring to FIG. 1, the refrigerant loop 10 also includes a number of first shut-off valves 15 (FIG. 1 only shows one first shut-off valve 15 for simplicity). Each of the first shut-off valves 15 can be operable between open and close to cause the main line 11 to selectively communicate with at least two of the first branch 12, the second branch 13 and the third branch 14. For example, the main line 11 can communicate with the first branch 12 and the third branch 14, so that the refrigerant can successively circulate in the compressor 110, the condenser 120, and the heat exchanger 140. The main line 11 can also communicate with the first branch 12 and the second branch 13, so that the refrigerant can successively circulate in the compressor 110, the condenser 120, and the evaporator 130.

In at least one embodiment, each of the first branch 12, the second branch 13, and the third branch 14 also includes an expansion valve 16. The expansion valve 16 is disposed between the condenser 120 and the evaporator 130, or between the condenser 120 and the heat exchanger 140. The expansion valve 16 can control a flow rate of the refrigerant into the condenser 120, the evaporator 130, or the heat exchanger 140.

In at least one embodiment, each of at least the main line 11, the second branch 13, and the third branch 14 further includes a temperature and pressure sensor 17. The temperature and pressure sensor 17 can sense a temperature value and a pressure value of the refrigerant passing through the main line 11, the second branch 13, or the third branch 14.

The motor coolant loop 30 includes a powertrain system A, a radiator 34, and a reservoir 35. In at least one embodiment, the powertrain system A includes a motor 31, an inverter 32, and a DC/DC converter 33. FIG. 1 shows the motor 31, the inverter 32, and the DC/DC converter 33 connect in series. However, in other embodiments, the location of the motor 31, the inverter 32, and the DC/DC converter 33 may be changed. For example, the motor 31 and the inverter 32 may connect in parallel. The reservoir 35 can store a heat transfer fluid (for example, the coolant). The motor coolant loop 30 can circulate the coolant through the motor 31, the inverter 32, the DC/DC converter 33, and the radiator 34 under the function of a pump 36. When the coolant flows through the motor 31, the inverter 32, the DC/DC converter 33, and the radiator 34, the heat generated by the motor 31, the inverter 32, and the DC/DC converter 33 is transferred to the coolant. The radiator 34 is positioned such that it can absorb heat from and release heat to ambient environment.

The battery coolant loop 20 includes a power supply system B. In at least one embodiment, the power supply system B includes a battery 21 and an autopilot electronic control unit (ECU) 22. FIG. 1 shows that the battery 21 and the autopilot ECU 22 connect in series. However, in other embodiments, the location of the battery 21 and the autopilot ECU 22 can also be varied, and the autopilot ECU 22 can also be omitted. The battery 21 outputs electric energy. The inverter 32 of the motor coolant loop 30 supplies the electric energy from the battery 21 to drive the motor 31. The motor 31 outputs motive power to a wheel of the electric vehicle 1. The battery coolant loop 20 can circulate the coolant through the battery 21 and the autopilot ECU 22 under the function of another pump 26. When the coolant flows through the battery 21 and the autopilot ECU 22, the heat generated by the battery 21 and the autopilot ECU 22 is transferred to the coolant.

In at least one embodiment, each of the battery coolant loop 20 and the motor coolant loop 30 further includes a temperature sensor 24. The temperature sensor 24 can sense a temperature value of the coolant passing through the battery coolant loop 20 or the motor coolant loop 30.

The thermal management system 100 further includes a valve package 40 for connecting the refrigerant loop 10, the battery coolant loop 20, and the motor coolant loop 30 together. In at least one embodiment, referring to FIGS. 3 to 8, the valve package 40 functions as an octovalve, which includes a valve body 41, ten outer ports disposed outside the valve body 41, and eight inner channels 43 disposed inside the valve body 41. The ten outer ports include three first outer ports 42a connected to the heat exchanger 140, two second outer ports 42b connected to the power supply system B, two third outer ports 42c connected to the powertrain system A, and three fourth outer ports 42d connected to the radiator 34. Eight of the ten outer ports selectively communicate with four of the eight inner channels 43, thereby allowing the valve package 40 to switch among sixth different states to change the direction of flow of the coolant in the thermal management system 100. In at least one embodiment, the valve body 41 includes an outer rotation handle (not shown), and a user can operate the rotation handle to rotate the valve body 41, thereby switching the valve package 40 among different states.

In other embodiments, as shown in FIG. 1, the valve package 40 can also include two four-way valves 40A and 40B separated from each other. Each of the four-way valves 40A and 40B includes the valve body 41 (not labeled in FIG. 1). The ten outer ports are respectively disposed outside the valve bodies 41 of the four-way valves 40A and 40B. The eight inner channels 43 are respectively disposed inside the valve bodies 41 of the four-way valves 40A and 40B.

Figure 3:
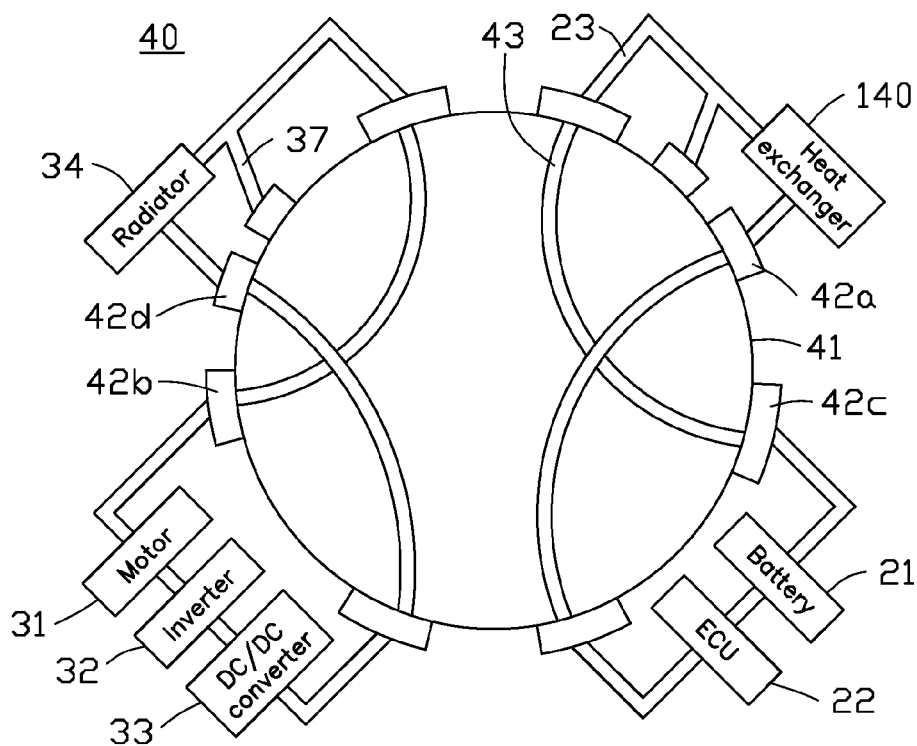
FIG. 3 is a diagrammatic view of an embodiment of a valve package of the thermal management system of FIG. 1, operating in a first state.

Referring to FIGS. 1 and 3, the battery coolant loop 20 further includes a first bypass path 23 connected to the heat exchanger 140. One of the first outer ports 42a connects to the first bypass path 23. When the first outer port 42a connecting the first bypass path 23 fluidically communicates with the inner channel 43, the coolant can bypass the heat exchanger 140 as needed. Integrating a separated bypass valve of the first bypass path 23 into the single valve package 40 can save cost. The motor coolant loop 30 further includes a second bypass path 37 connected to the radiator 34. One of the fourth outer ports 42d connects to the second bypass path 37. When the fourth outer port 42d connecting the second bypass path 37 fluidically communicates with the inner channel 43, the coolant can bypass the radiator 34 as needed. The radiator 34 being bypass can save the power of the pump 36.

Referring to FIG. 3, when the valve package 40 is in a first state, the battery coolant loop 20 and the motor coolant loop 30 connect in parallel. The coolant is divided into two separated loops. One loop is that the coolant can successively pass through the heat exchanger 140, the autopilot ECU 22, and the battery 21. The other loop is that the coolant can successively pass through the DC/DC converter 33, the inverter 32, the motor 31, and the radiator 34.

Figure 4:
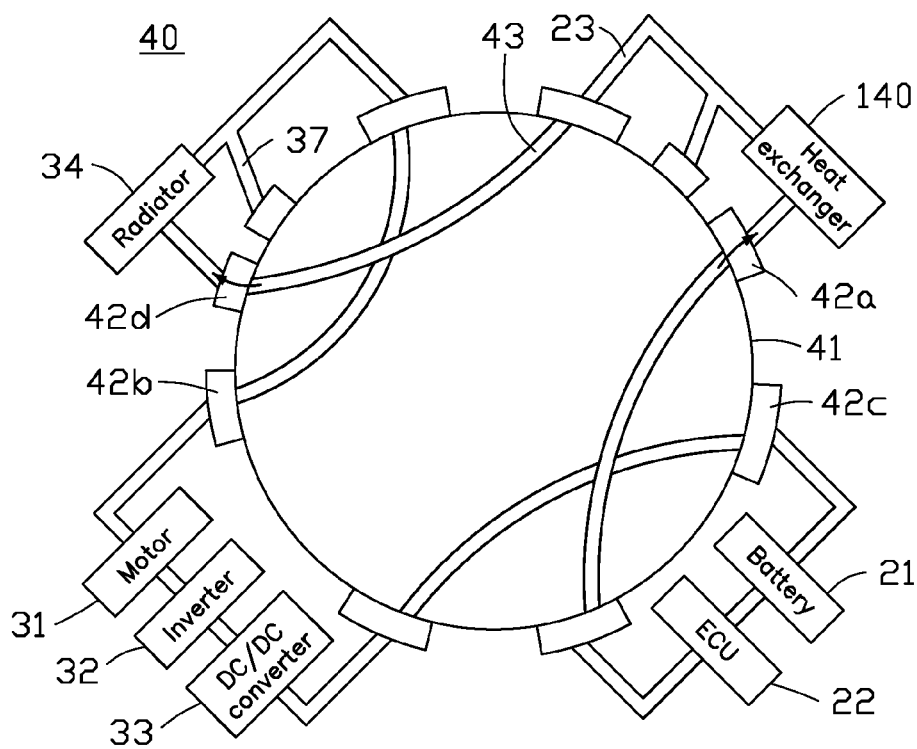
FIG. 4 is a diagrammatic view of an embodiment of a valve package of the thermal management system of FIG. 1, operating in a second state.

Referring to FIG. 4, when the valve package 40 is in a second state, the battery coolant loop 20 and the motor coolant loop 30 connect in series. The coolant can successively pass through the heat exchanger 140, the autopilot ECU 22, the battery 21, the DC/DC converter 33, the inverter 32, the motor 31, and the radiator 34.

Figure 5:
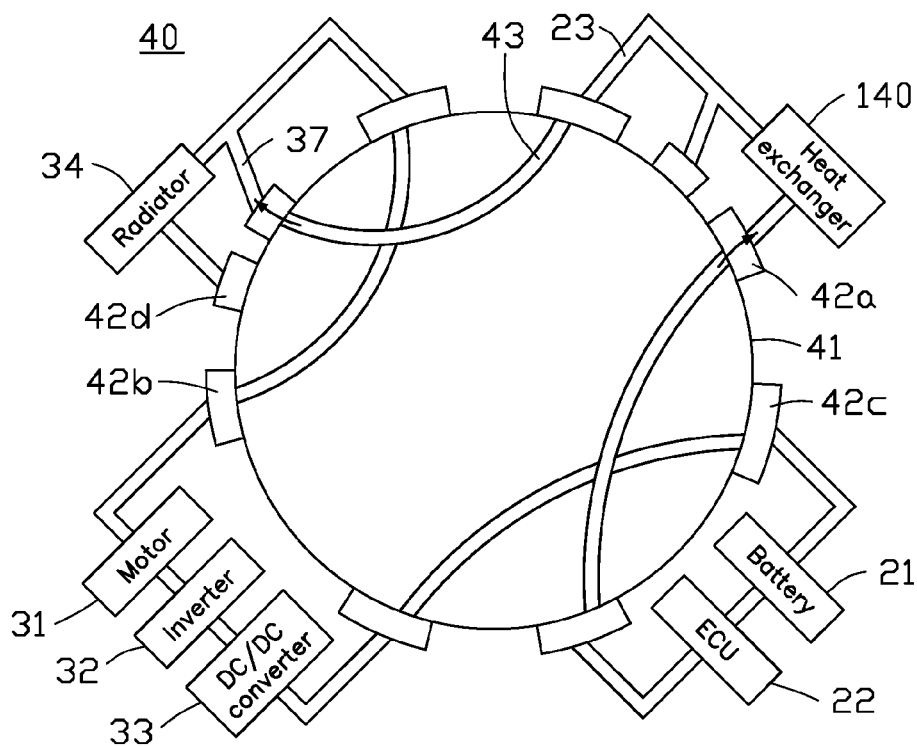
FIG. 5 is a diagrammatic view of an embodiment of a valve package of the thermal management system of FIG. 1, operating in a third state.

Referring to FIG. 5, when the valve package 40 is in a third state, the battery coolant loop 20 and the motor coolant loop 30 connect in series. The coolant can successively pass through the heat exchanger 140, the autopilot ECU 22, the battery 21, the DC/DC converter 33, the inverter 32, and the motor 31. The radiator 34 is bypassed.

Figure 6:
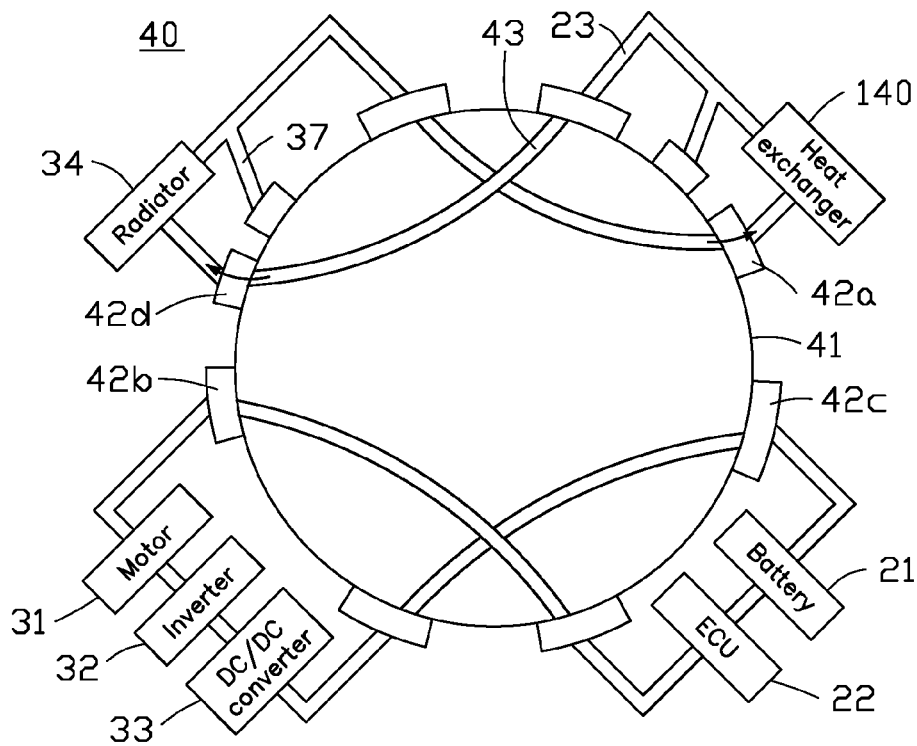
FIG. 6 is a diagrammatic view of an embodiment of a valve package of the thermal management system of FIG. 1, operating in a fourth state.

Referring to FIG. 6, when the valve package 40 is in a fourth state, the battery coolant loop 20 and the motor coolant loop 30 connect in parallel. The coolant is divided into two separated loops. One loop is that the coolant can successively pass through the heat exchanger 140 and the radiator 34. The other loop is that the coolant can successively pass through the motor 31, the inverter 32, the DC/DC converter 33, the battery 21, and the autopilot ECU 22.

Figure 7:
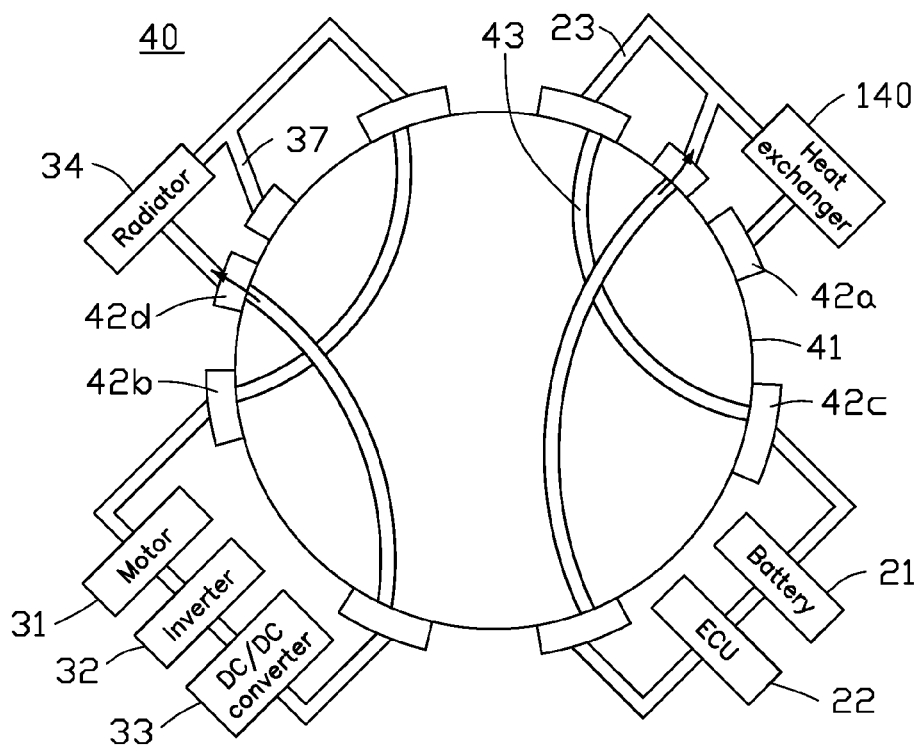
FIG. 7 is a diagrammatic view of an embodiment of a valve package of the thermal management system of FIG. 1, operating in a fifth state.

Referring to FIG. 7, when the valve package 40 is in a fifth state, the battery coolant loop 20 and the motor coolant loop 30 connect in parallel. The coolant is divided into two separated loops. One loop is that the coolant can successively pass through the autopilot ECU 22 and the battery 21. The other loop is that the coolant can successively pass through the radiator 34, the DC/DC converter 33, the inverter 32, and the motor 31. The heat exchanger 140 is bypassed.

Figure 8:
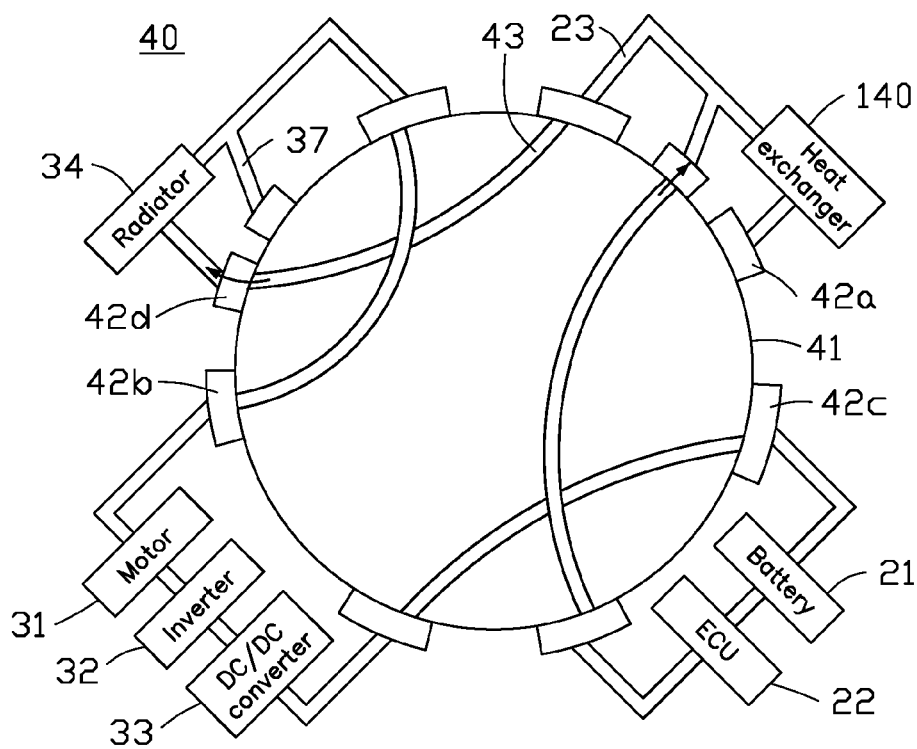
FIG. 8 is a diagrammatic view of an embodiment of a valve package of the thermal management system of FIG. 1, operating in a sixth state.

Referring to FIG. 8, when the valve package 40 is in a sixth state, the battery coolant loop 20 and the motor coolant loop 30 connect in series. The coolant can successively pass through the autopilot ECU 22, the battery 21, the DC/DC converter 33, the inverter 32, the motor 31, and the radiator 34. The heat exchanger 140 is bypassed.

Referring to FIG. 1, in at least one embodiment, the motor coolant loop 30 further includes a third bypass path 38 connected to the DC/DC converter 33. The third bypass path 38 includes a second shut-off valve 380, which can be operable between open and close to allow the coolant to pass through or bypass the DC/DC converter 33 as needed. Thus, the power of the pump 36 can be reduced. The battery coolant loop 20 can also include a third bypass path 25 connected to the autopilot ECU 22. The third bypass path 25 includes a second shut-off valve 250, which can be operable between open and close to allow the coolant to pass through or bypass the autopilot ECU 22 as needed. Thus, the power of the pump 26 can be reduced.

The thermal management system 100 can operate in a plurality of modes depending on an ambient temperature, while different modes having different directions of flows of three fluids (that is, the air, the refrigerant, and the coolant) within the thermal management system 100. For example, the thermal management system 100 can operate in a plurality of heating modes when an ambient temperature is low, thereby providing warm air to the passenger cabin 2. In at least one embodiment, nine heating modes are included. The working principles of the respective heating modes will be described as follows, with reference to FIGS. 9A to 17B. The solid line and the chain line in the figures represent a passage of a corresponding fluid, and a dotted line represents no fluid passage.

First Heating Mode

Figure 9A:
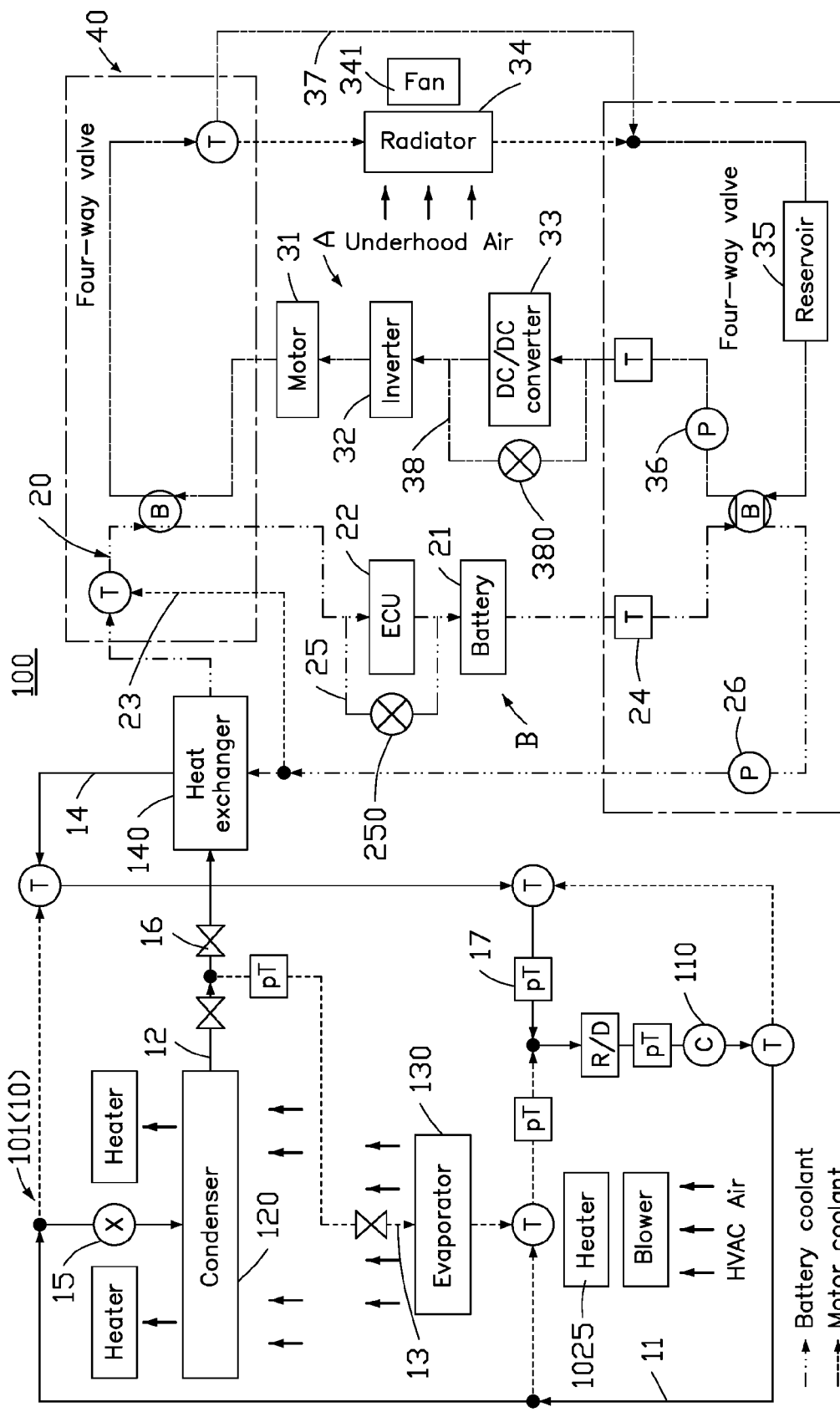
FIG. 9A is a diagrammatic view of the thermal management system of FIG. 1, operating in a first heating mode.
Figure 9B:
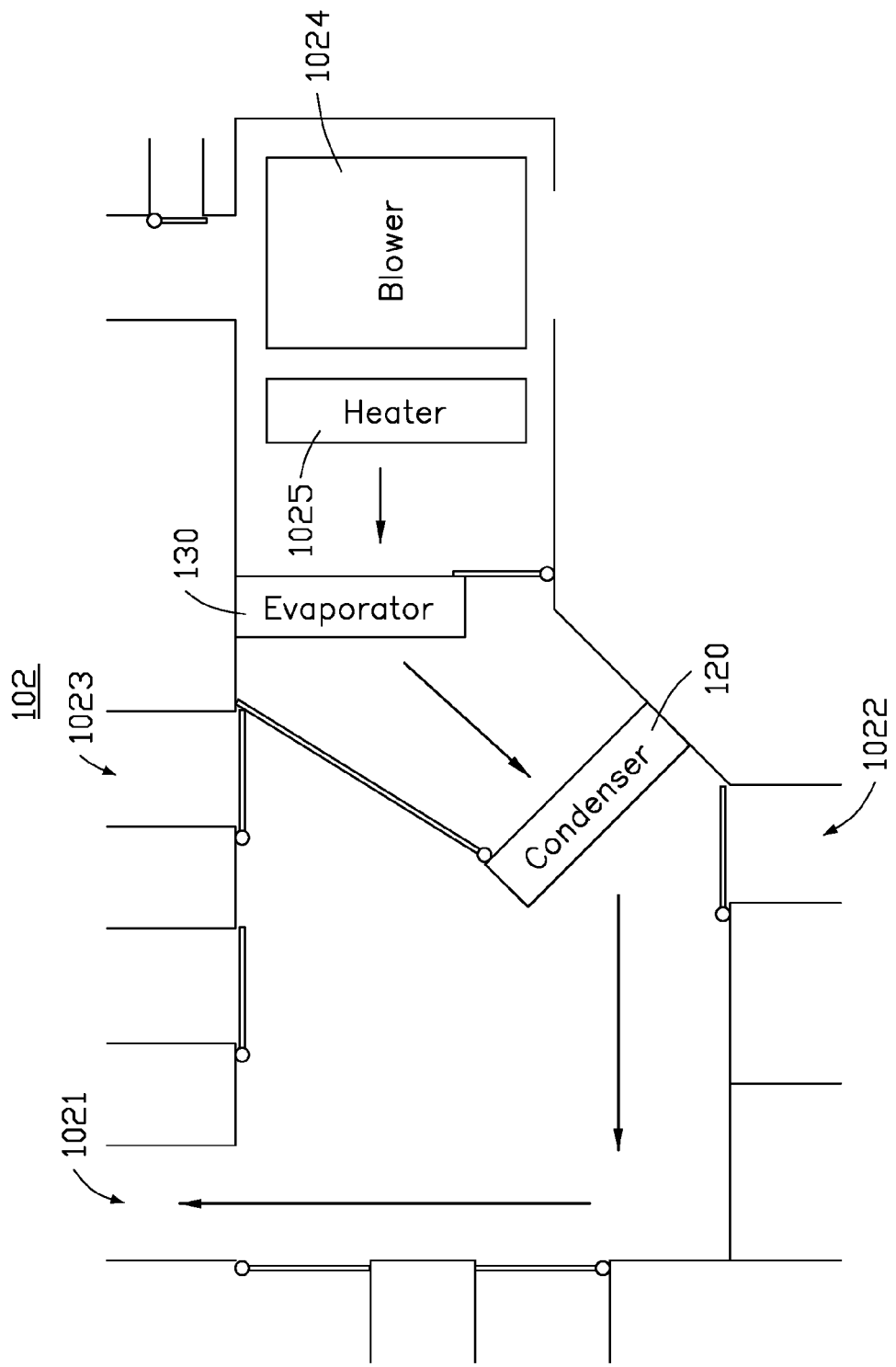
FIG. 9B is a diagrammatic view of the HVAC box of the thermal management system of FIG. 9A.

The thermal management system 100 can switch to the first heating mode at an ambient temperature higher than −10□ and lower than 20□. Referring to FIGS. 9A and 9B, the compressor 110, the condenser 120, and the heat exchanger 140 successively communicate, so that the refrigerant can successively circulate in the compressor 110, the condenser 120, and the heat exchanger 140. The compressor 110 compresses a vapor of the refrigerant with low temperature and low pressure contained within the refrigerant loop 10 into a vapor with high temperature and high pressure. After passing through the condenser 120, the refrigerant changes phase from vapor to liquid and release heat. The refrigerant further changes phase from liquid to vapor after passing through the heat exchanger 140, that is, the heat exchanger 140 functions as an evaporator. The vapor is then circulated back into the compressor 110. The first air vent 1021 is opened and the second and third air vent 1023 are closed, and the blower 1024 blows the heat from the condenser 120 into the passenger cabin 2, thereby warming up the passenger cabin 2.

Furthermore, the valve package 40 is switched to the third state, causing the coolant to successively pass through the heat exchanger 140, the autopilot ECU 22, the battery 21, the DC/DC converter 33, the inverter 32, and the motor 31, while the radiator 34 being bypassed. When the coolant passes through the heat exchanger 140, the waste heat of the coolant is absorbed by the refrigerant flowing through the heat exchanger 140, and further released to the passenger cabin 2 by the condenser 120. Thus, the waste heat of the power supply system B and the powertrain system A can both be used to warm up the passenger cabin 2.

Second Heating Module

Figure 10:
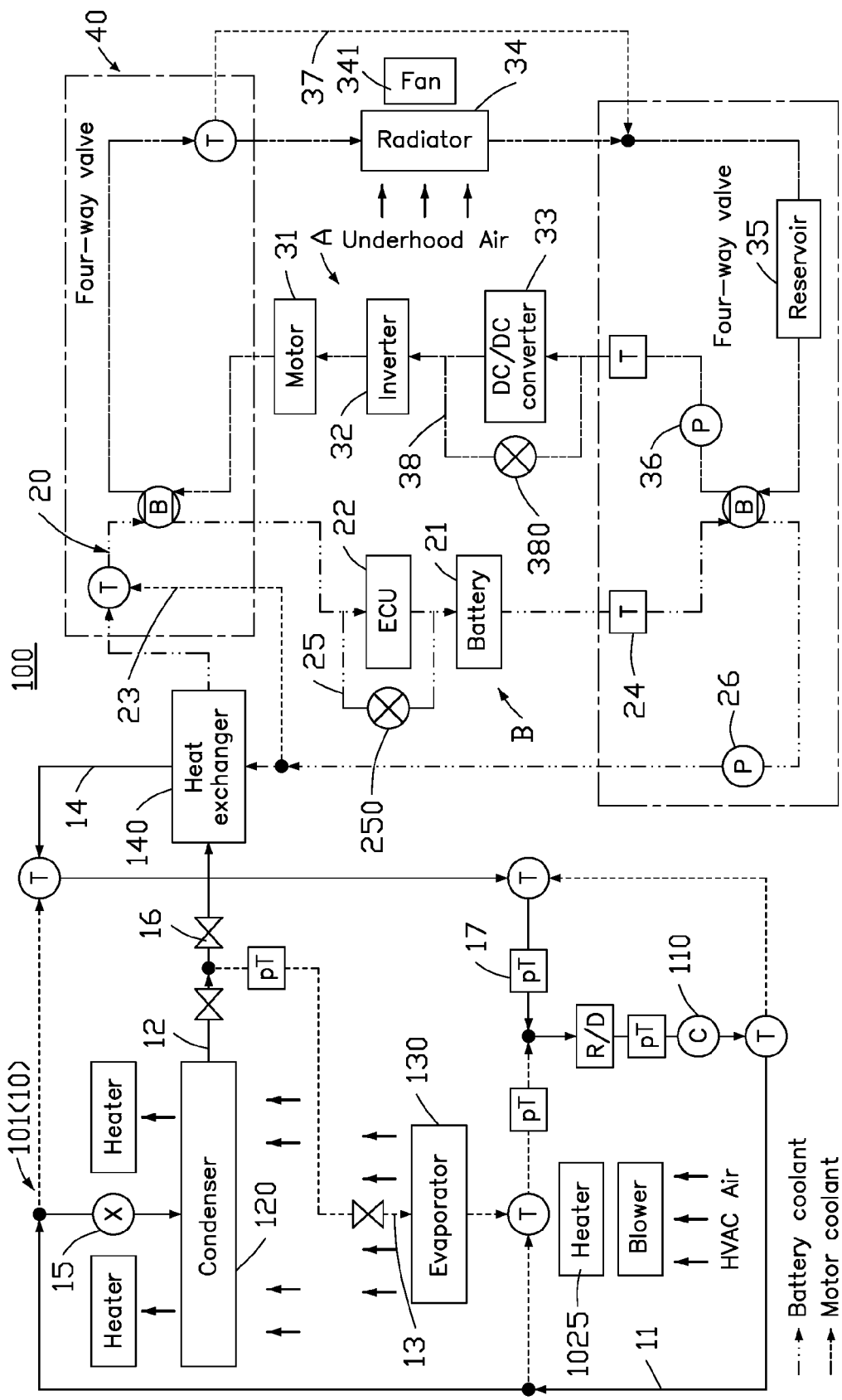
FIG. 10 is a diagrammatic view of the thermal management system of FIG. 1, operating in a second heating mode.

The thermal management system 100 can switch to the second heating mode at an ambient temperature higher than −10□ and lower than 20□. Referring to FIG. 10, different from the first heating mode, the valve package 40 is switched to the fourth state, causing the coolant to be divided into two separated loops. One loop is that the coolant successively passes through the heat exchanger 140 and the radiator 34. The other loop is that the coolant successively passes through the motor 31, the inverter 32, the DC/DC converter 33, the battery 21, and the autopilot ECU 22. In this case, the coolant passing through the radiator 34 can absorb heat from the ambient environment. The heat is absorbed by the refrigerant flowing through the heat exchanger 140, and then released to the passenger cabin 2 by the condenser 120. The waste heat of the power supply system B and the powertrain system A is conserved. In at least one embodiment, one or more fans 341 are positioned in front of the radiator 34. The amount of the ambient air passing through the radiator 34 can be increased by the one or more fans 341.

Third Heating Mode

Figure 11:
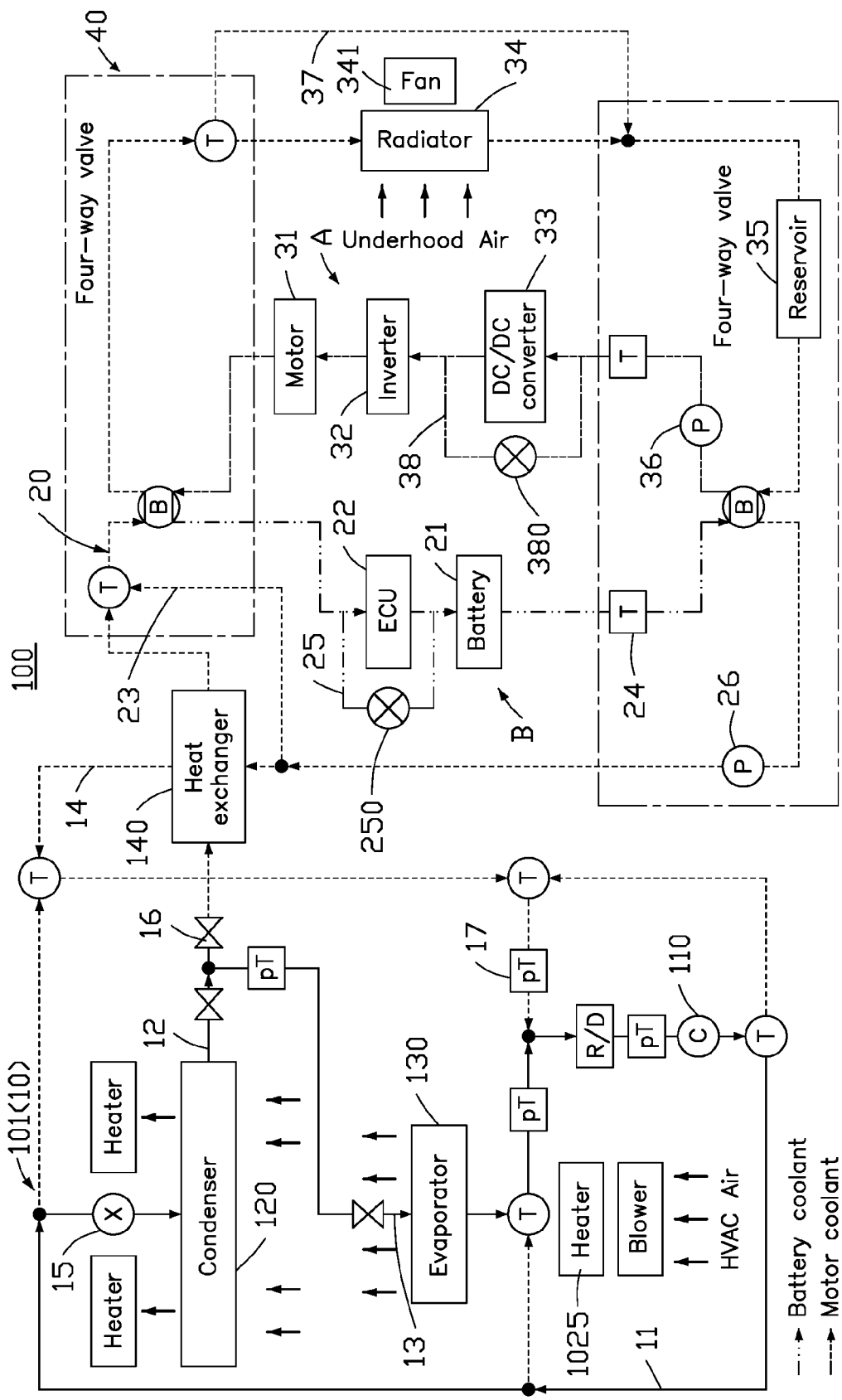
FIG. 11 is a diagrammatic view of the thermal management system of FIG. 1, operating in a third heating mode.

The thermal management system 100 can switch to the third heating mode at an ambient temperature lower than −10□. Referring to FIG. 11, different from the second heating mode, the compressor 110, the condenser 120, and the evaporator 130 communicate to each other, so that the refrigerant can successively circulate in the compressor 110, the condenser 120, and the evaporator 130. In this case, the compressor 110 compresses a vapor of the refrigerant with low temperature and low pressure contained within the refrigerant loop 10 into a vapor with high temperature and high pressure. After passing through the condenser 120, the refrigerant changes phase from vapor to liquid and releases heat. The blower 1024 blows the heat across the passenger cabin 2. The refrigerant further changes phase from liquid to vapor after passing through the evaporator 130. The vapor is then circulated back into the compressor 110. In this case, the refrigerant absorbs very little heat through the heat exchanger 140. Almost 100% of the electric energy of the compressor 110 is converted into the heat to warm up the passenger cabin 2.

Furthermore, the valve package 40 is switched to the fourth state, but the coolant only flows through the loop including the motor 31, the inverter 32, the DC/DC converter 33, the battery 21, and the autopilot ECU 22. No coolant flows through the loop including the heat exchanger 140 and the radiator 34, that is, the coolant does not exchange heat with the refrigerant passing through the heat exchanger 140. In this case, the waste heat of the power supply system B and the powertrain system A is conserved.

Fourth Heating Mode

Figure 12:
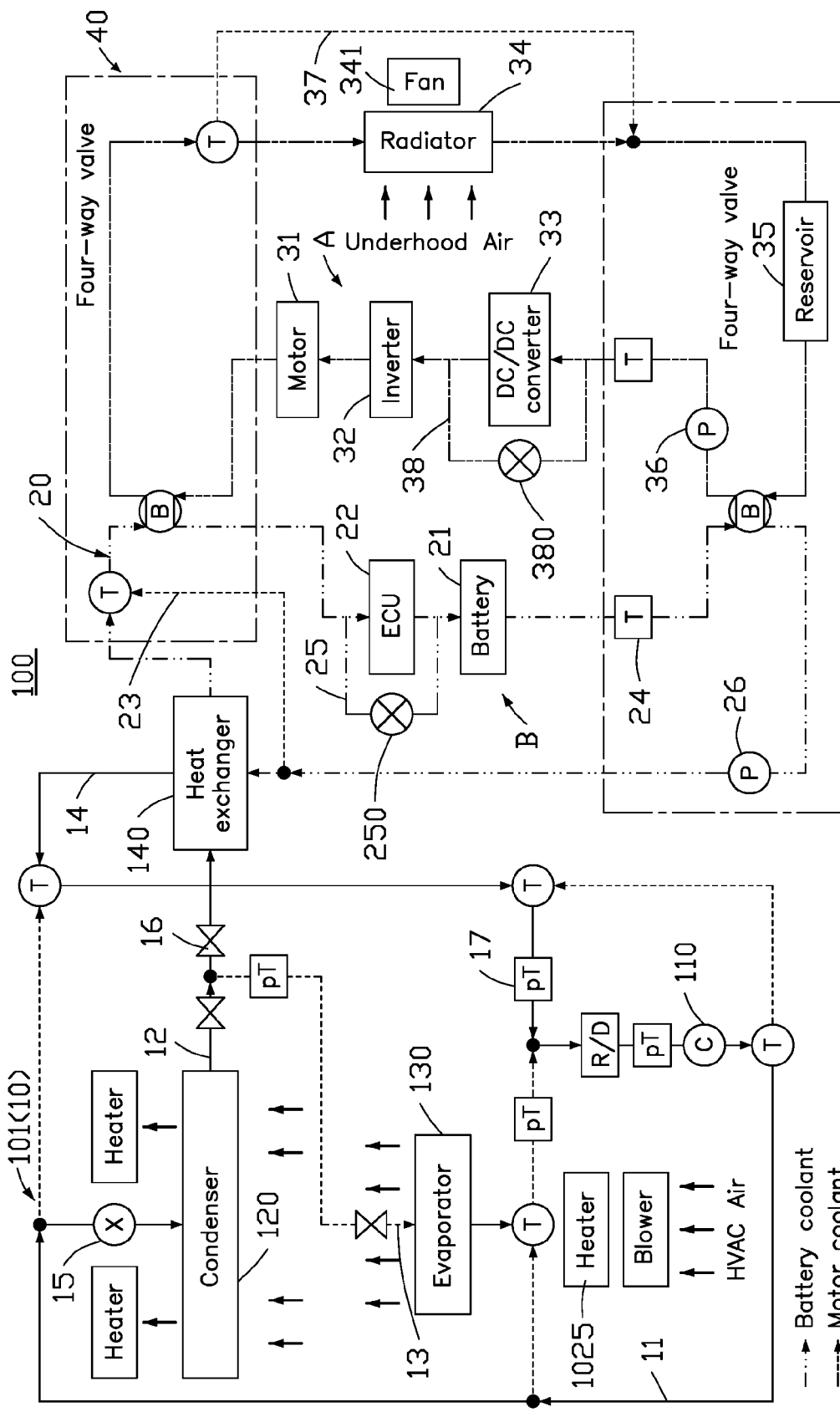
FIG. 12 is a diagrammatic view of the thermal management system of FIG. 1, operating in a fourth heating mode.

The thermal management system 100 can switch to the fourth heating mode at an ambient temperature lower than −20□. Referring to FIG. 12, different from the first heating mode, the HVAC box 102 of the third heating mode further includes at least one heater 1025. The at least one heater 1025 is disposed in in front of the blower 1024 or the condenser 120, and can heat the air blowing into the passenger cabin 2. This mode can be combined with other heating modes, for example, the first to the third heating modes. In at least one embodiment, the heater 1025 is a Positive Temperature Coefficient (PTC) thermistor.

Fifth Heating Mode

Figure 13A:
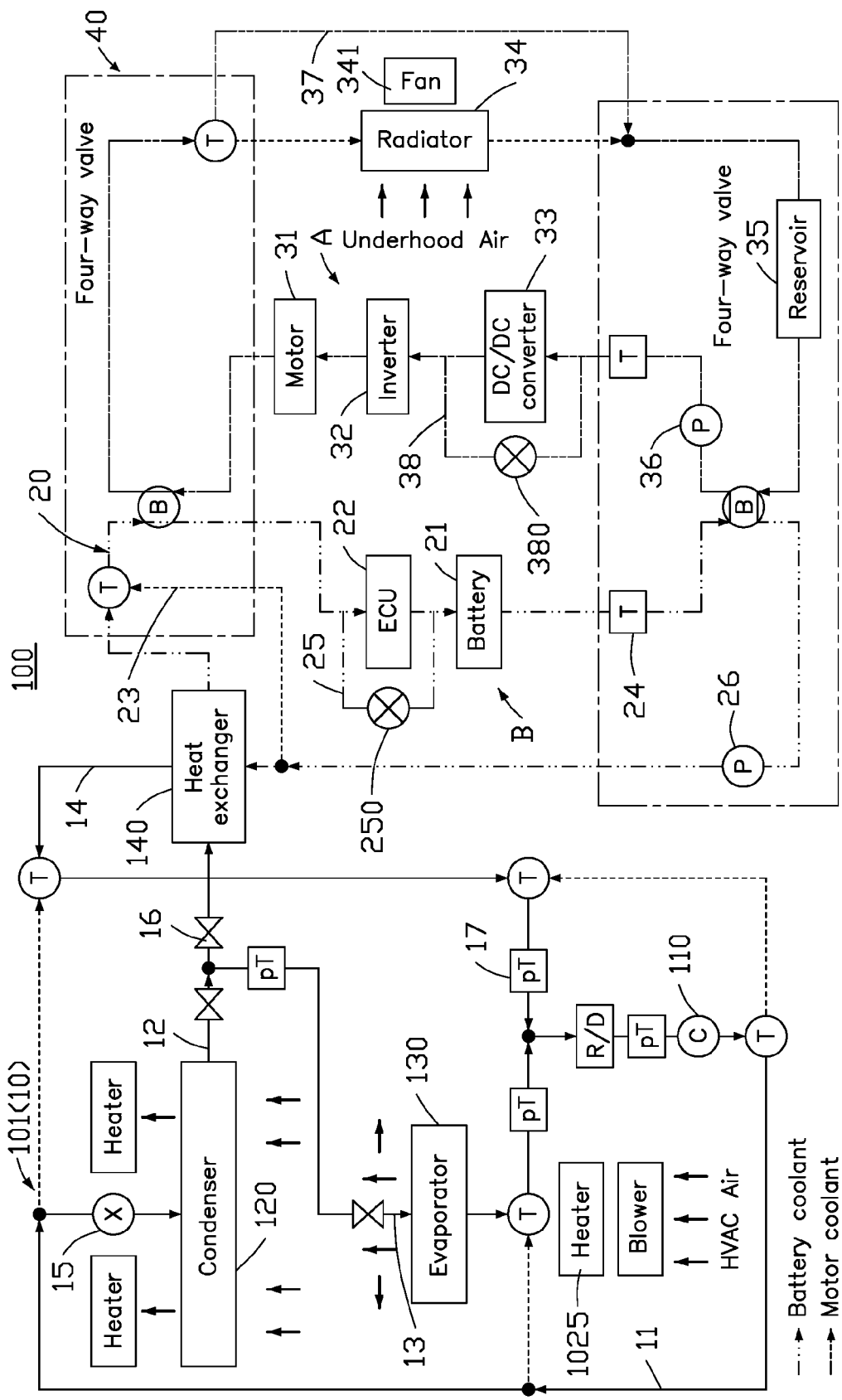
FIG. 13A is a diagrammatic view of the thermal management system of FIG. 1, operating in a fifth heating mode.
Figure 13B:
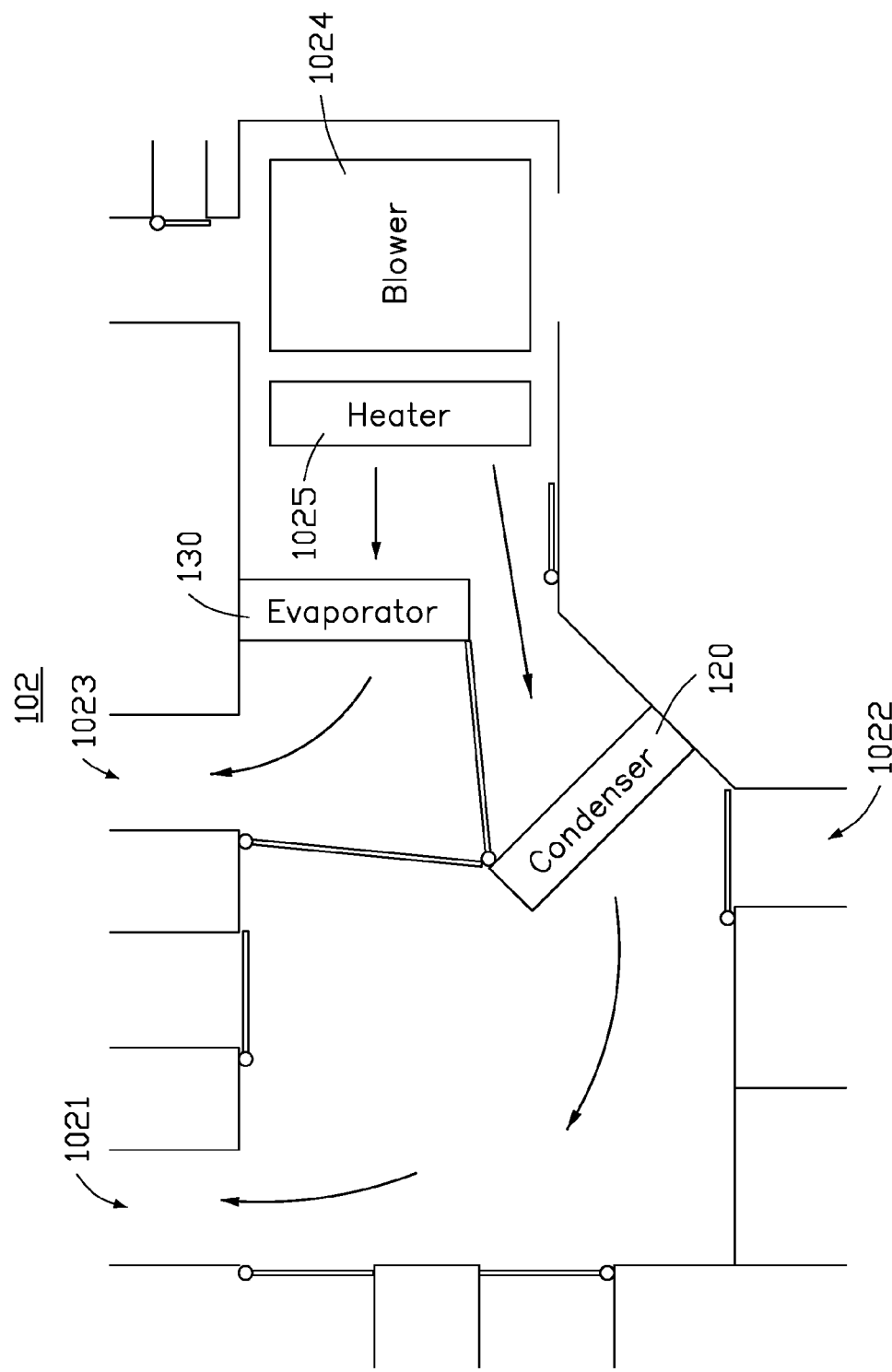
FIG. 13B is a diagrammatic view of the HVAC box of the thermal management system of FIG. 13A.

The thermal management system 100 can switch to the fifth heating mode at an ambient temperature higher than −10□ and lower than 5□. Referring to FIGS. 13A and 13B, different from the first heating mode, the compressor 110 and the condenser 120 communicate with each of the evaporator 130 and the heat exchanger 140, and the evaporator 130 and the heat exchanger 140 connect in parallel. Thus, when the refrigerant successively circulates in the compressor 110 and the condenser 120, the refrigerant at the downstream end of the condenser 120 splits into two portions, one portion guiding to the evaporator 130 and the other portion guiding to the heat exchanger 140. In this case, the first air vent 1021 is opened, and the heat from the condenser 120 is released to the passenger cabin 2 through the first air vent 1021. The third air vent 1023 is opened, and the cold air from the downstream end of the evaporator 130 is extracted into the ambient environment through the third air vent 1023, instead of flowing through the passenger cabin 2. That is, the evaporator 130 functions as an external heat exchanger.

Furthermore, the refrigerant flowing through the heat exchanger 140 not only can absorb the waste heat of the power supply system B and the powertrain system A, but can also absorb the heat from the ambient air. The heat can then be used to warm up the passenger cabin 2.

Sixth Heating Mode

Figure 14A:
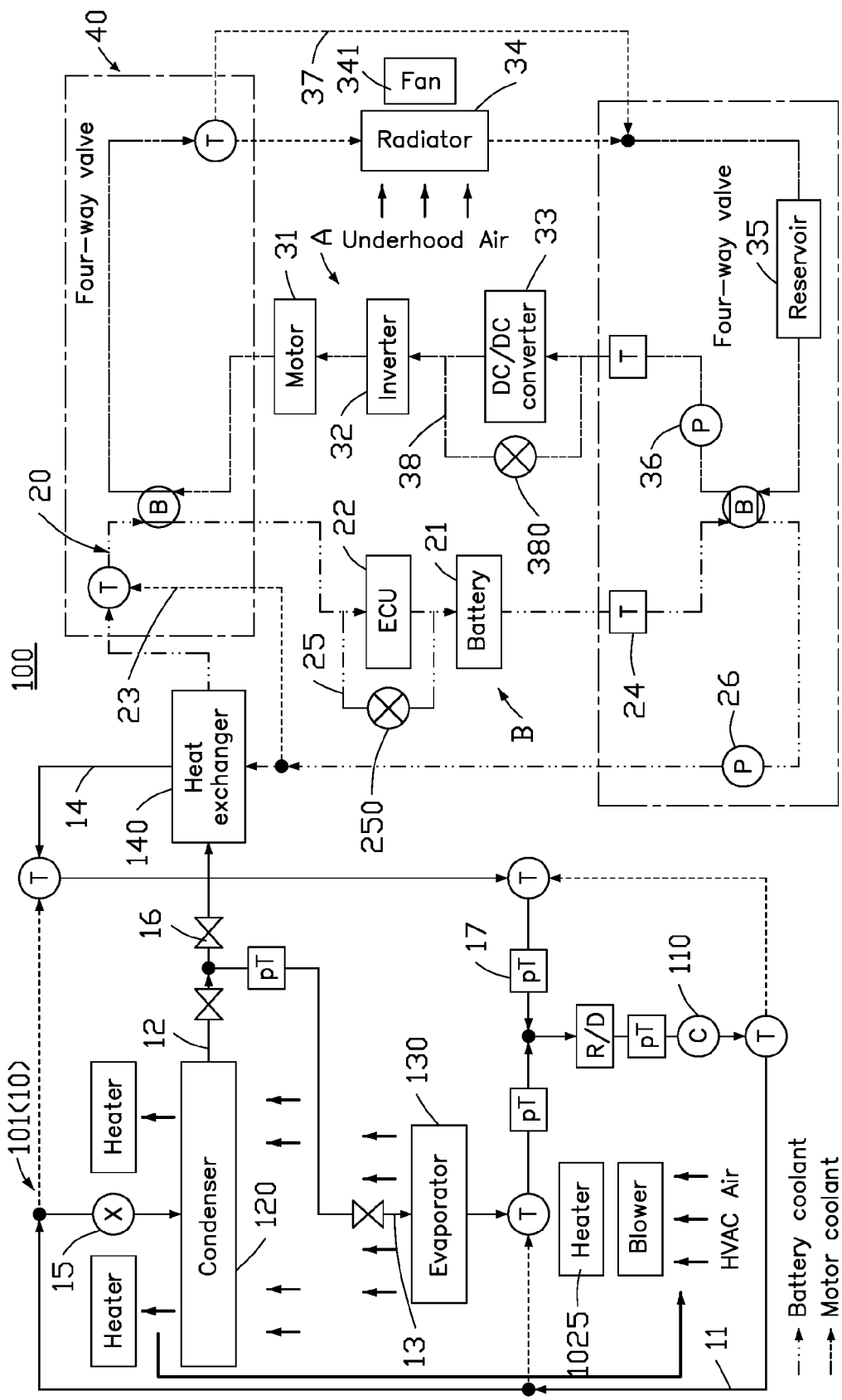
FIG. 14A is a diagrammatic view of the thermal management system of FIG. 1, operating in a sixth heating mode.
Figure 14B:
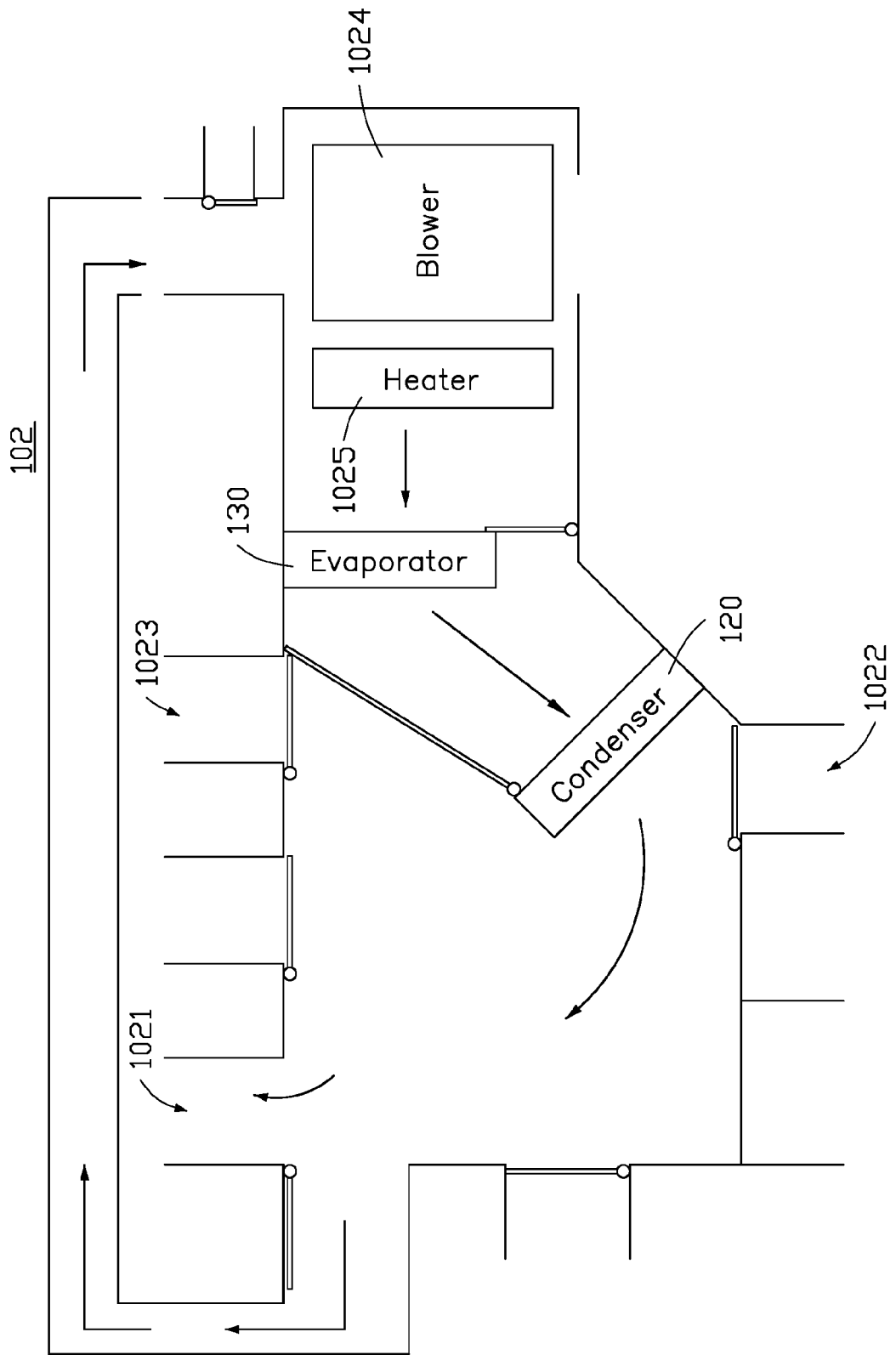
FIG. 14B is a diagrammatic view of the HVAC box of the thermal management system of FIG. 14A.

The thermal management system 100 can switch to the sixth heating mode at an ambient temperature higher than −10□ and lower than 5□. Referring to FIGS. 14A and 14B, different from the fifth heating mode, the first air vent 1021 is still opened but the third air vent 1023 is closed, so that the cold air from the evaporator 130 is not extracted into the ambient environment. An air path is formed between the HVAC box 102 and the passenger cabin 2, and an internal cycle of air is realized between the evaporator 130, the condenser 120, and the passenger cabin 2. Thus, the heat transfer between the evaporator 130 and the condenser 120 is enhanced.

Seventh Heating Mode

Figure 15:
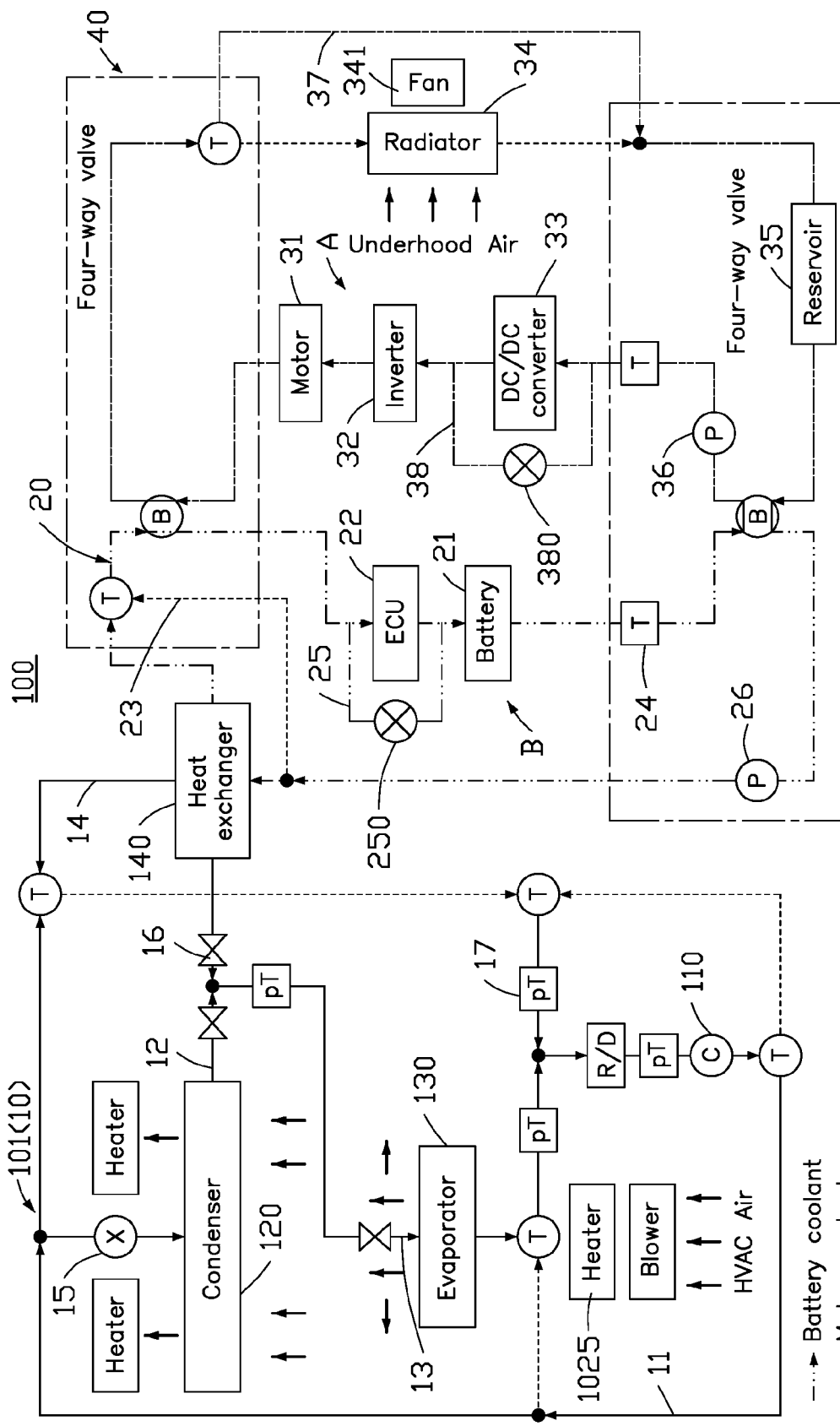
FIG. 15 is a diagrammatic view of the thermal management system of FIG. 1, operating in a seventh heating mode.

The thermal management system 100 can switch to the seventh heating mode at an ambient temperature higher than −30□ and lower than 10□. Referring to FIG. 15, different from the fifth heating mode, the condenser 120 and the heat exchanger 140 connect in parallel. The compressor 110 communicates with the upstream ends of the condenser 120 and the heat exchanger 140. The evaporator 130 communicates with the downstream ends of the condenser 120 and the heat exchanger 140. Thus, the refrigerant at the downstream end of the compressor 110 splits into two portions, one portion guiding to the condenser 120 and the other portion guiding to the heat exchanger 140. In this case, each of the condenser 120 and the heat exchanger 140 functions as a condenser that causes the refrigerant to change phase from vapor to liquid and release heat. The refrigerant further changes phase from liquid to vapor after passing through the heat evaporator 120 and absorbs heat.

Thus, the first air vent 1021 is opened, and the heat from the condenser 120 is released to the passenger cabin 2 through the first air vent 1021. The third air vent 1023 is opened, and the cold air from the downstream end of the evaporator 130 is extracted into the ambient environment through the third air vent 1023, instead of flowing through the passenger cabin 2. Also different from the fifth heating mode, the heat from the heat exchanger 140 can be released to the coolant passing through the heat exchanger 140 to warm up the battery 21.

Eighth Heating Mode

Figure 16:
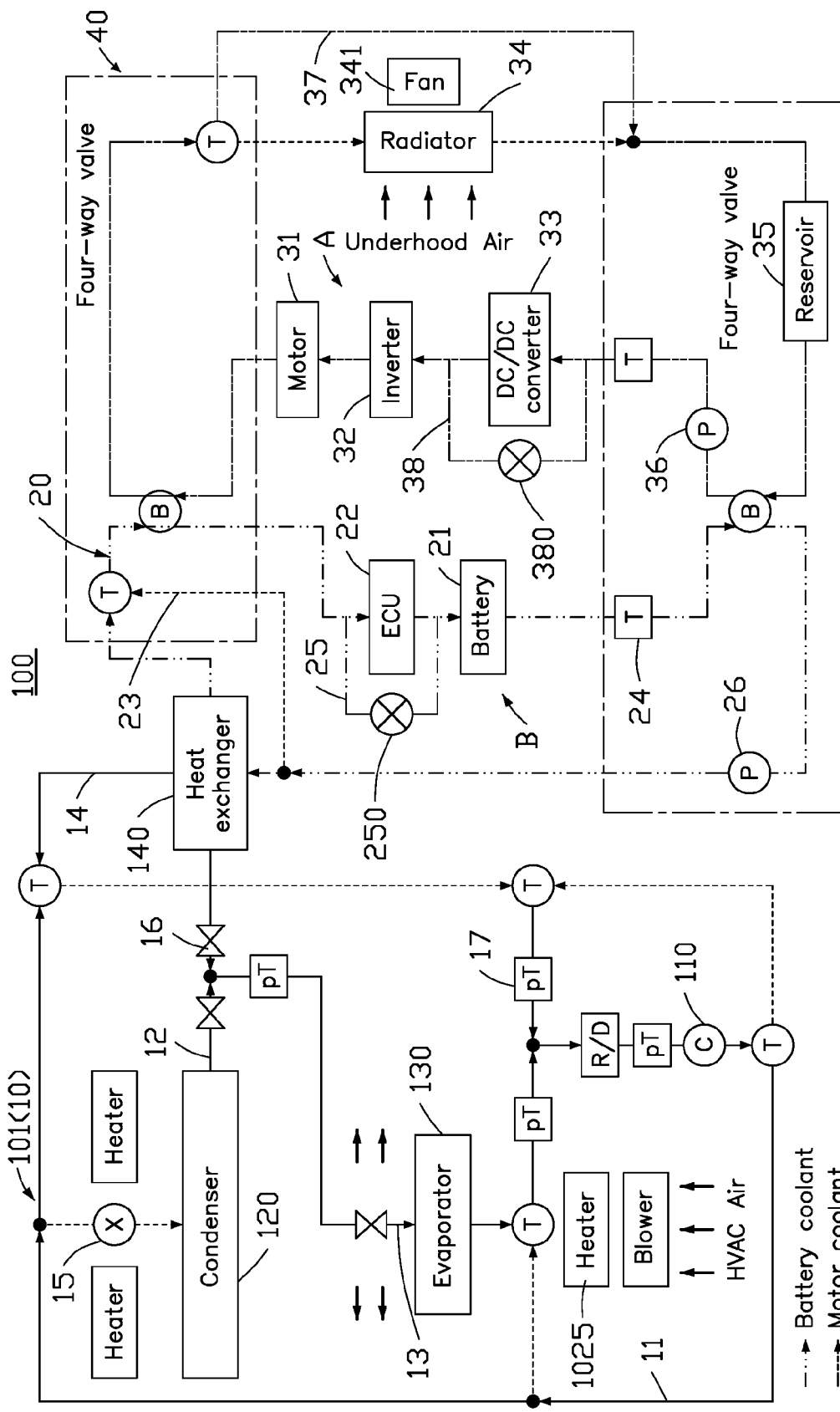
FIG. 16 is a diagrammatic view of the thermal management system of FIG. 1, operating in an eighth heating mode.

The thermal management system 100 can switch to the eighth heating mode at an ambient temperature lower than 0□. Referring to FIG. 16, the compressor 110, the heat exchanger 140, and the evaporator 130 successively communicate, so that the refrigerant can successively circulate in the compressor 110, the heat exchanger 140, and the evaporator 130. The compressor 110 compresses a vapor of the refrigerant with low temperature and low pressure contained within the refrigerant loop 10 into a vapor with high temperature and high pressure. After passing through the heat exchanger 140, the refrigerant changes phase from vapor to liquid and release heat. That is, the heat exchanger 140 functions as a condenser. The refrigerant further changes phase from liquid to vapor after passing through the evaporator 130. The vapor is then circulated back into the compressor 110. In this case, the cold air from the evaporator 130 is ejected into the ambient environment through the third air vent 1023, instead of flowing through the passenger cabin 2.

The valve package 40 is switched to the first state, causing the battery coolant loop 20 and the motor coolant loop 30 to connect in parallel. The coolant is divided into two separated loops. One loop is that the coolant can successively pass through the heat exchanger 140, the autopilot ECU 22, and the battery 21. The other loop is that the coolant can successively pass through the DC/DC converter 33, the inverter 32, and the motor 31. The radiator 34 is bypassed. Thus, the heat from the heat exchanger 140 can further be released to the coolant passing through the heat exchanger 140, thereby warming up the battery 21. Thus, the thermal management system 100 can switch to the eighth heating mode for preconditioning the battery 21 in cold weather.

Ninth Heating Mode

Figure 17A:
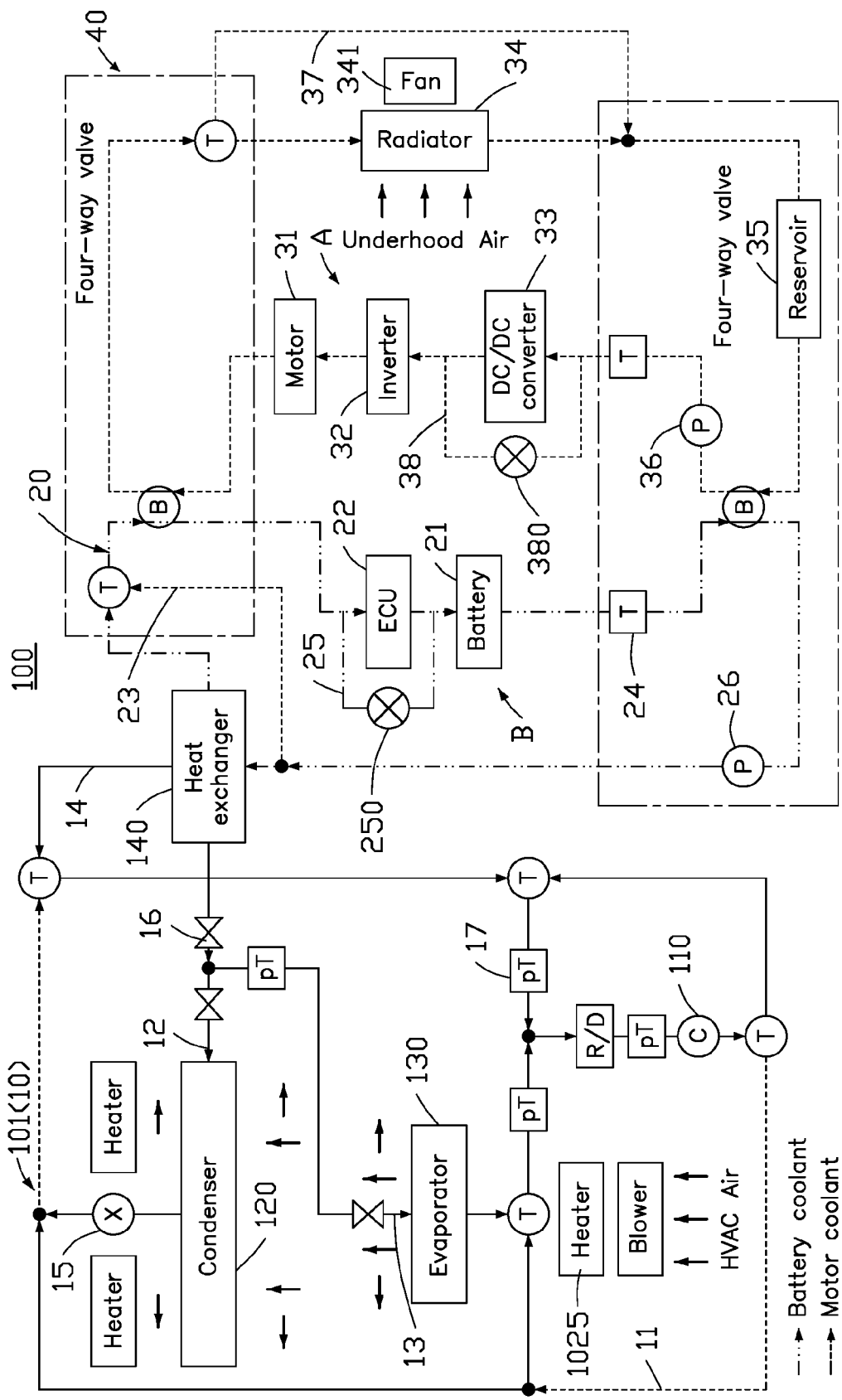
FIG. 17A is a diagrammatic view of the thermal management system of FIG. 1, operating in a ninth heating mode.
Figure 17B:
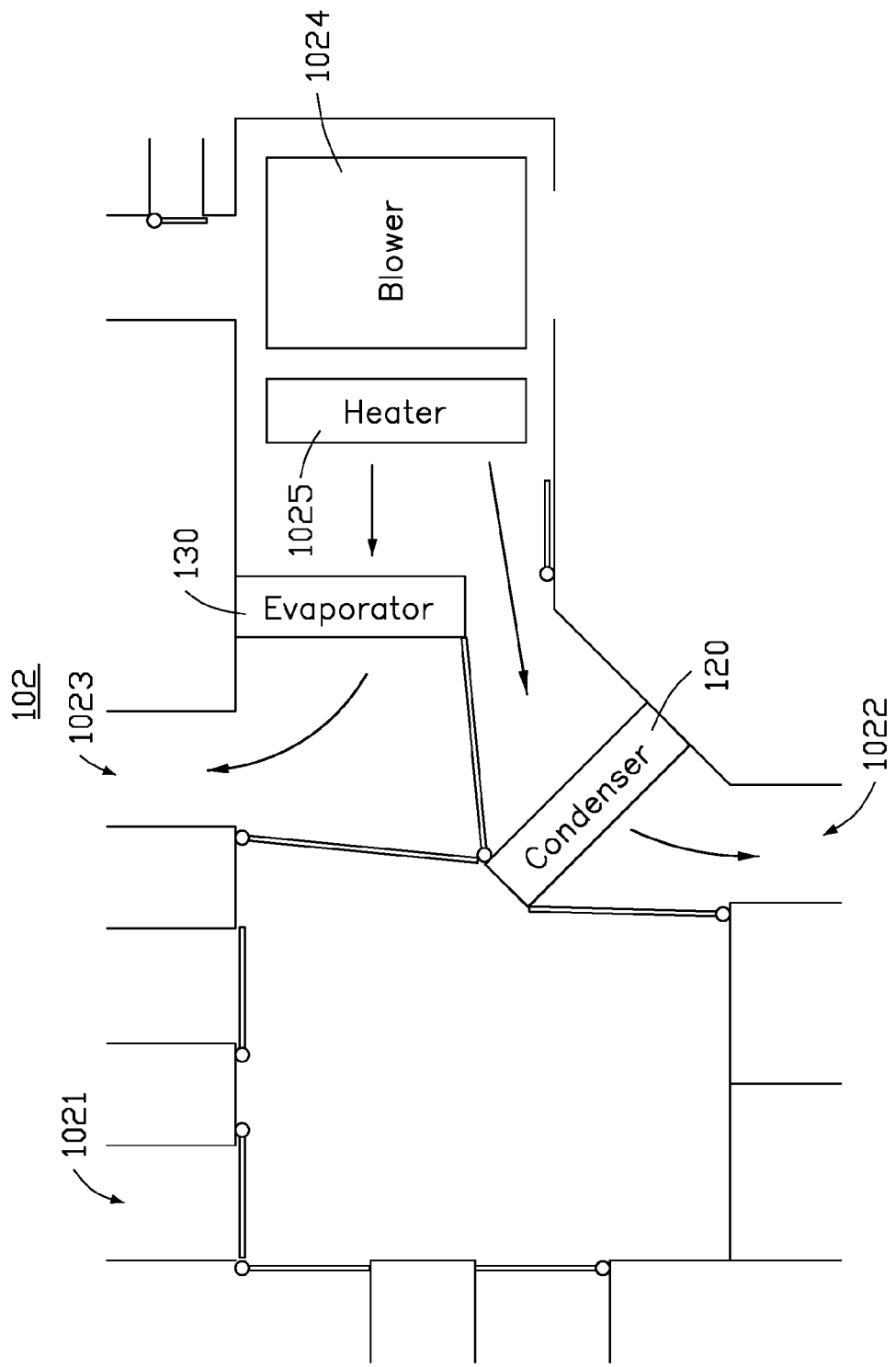
FIG. 17B is a diagrammatic view of the HVAC box of the thermal management system of FIG. 17A.

The thermal management system 100 can switch to the ninth heating mode at an ambient temperature lower than 0□. Referring to FIGS. 17A and 17B, different from the eighth heating mode, the evaporator 130 and the condenser 120 connect in parallel to the downstream end of the heat exchanger 140. Thus, when the refrigerant successively circulates in the compressor 110 and the heat exchanger 140, the refrigerant at the downstream end of the heat exchanger 140 splits into two portions, one portion guiding to the evaporator 130 and the other portion guiding to the condenser 120. In this case, each of the condenser 120 and the evaporator 130 functions as an evaporator. The cold air from each of the condenser 120 and the evaporator 130 can be extracted to the ambient environment through the second and third air vent 1023s. The heat from the heat exchanger 140 can further be released to the coolant passing through the heat exchanger 140, thereby warming up the battery 21. Since the refrigerant loop 10 includes two evaporators operates in parallel, the preconditioning time for the battery 21 in cold weather is minimized.

The thermal management system 100 can also operate in a plurality of cooling modes when the ambient temperature is high, thereby providing cool air to the passenger cabin 2. In at least one embodiment, four cooling modes are included. The working principles of the respective cooling modes will be described as follows, with reference to FIGS. 18 to 21B. The solid line and the chain line in the figures represent a passage of a corresponding fluid, and a dotted line represents no fluid passage.

First Cooling Mode

Figure 18:
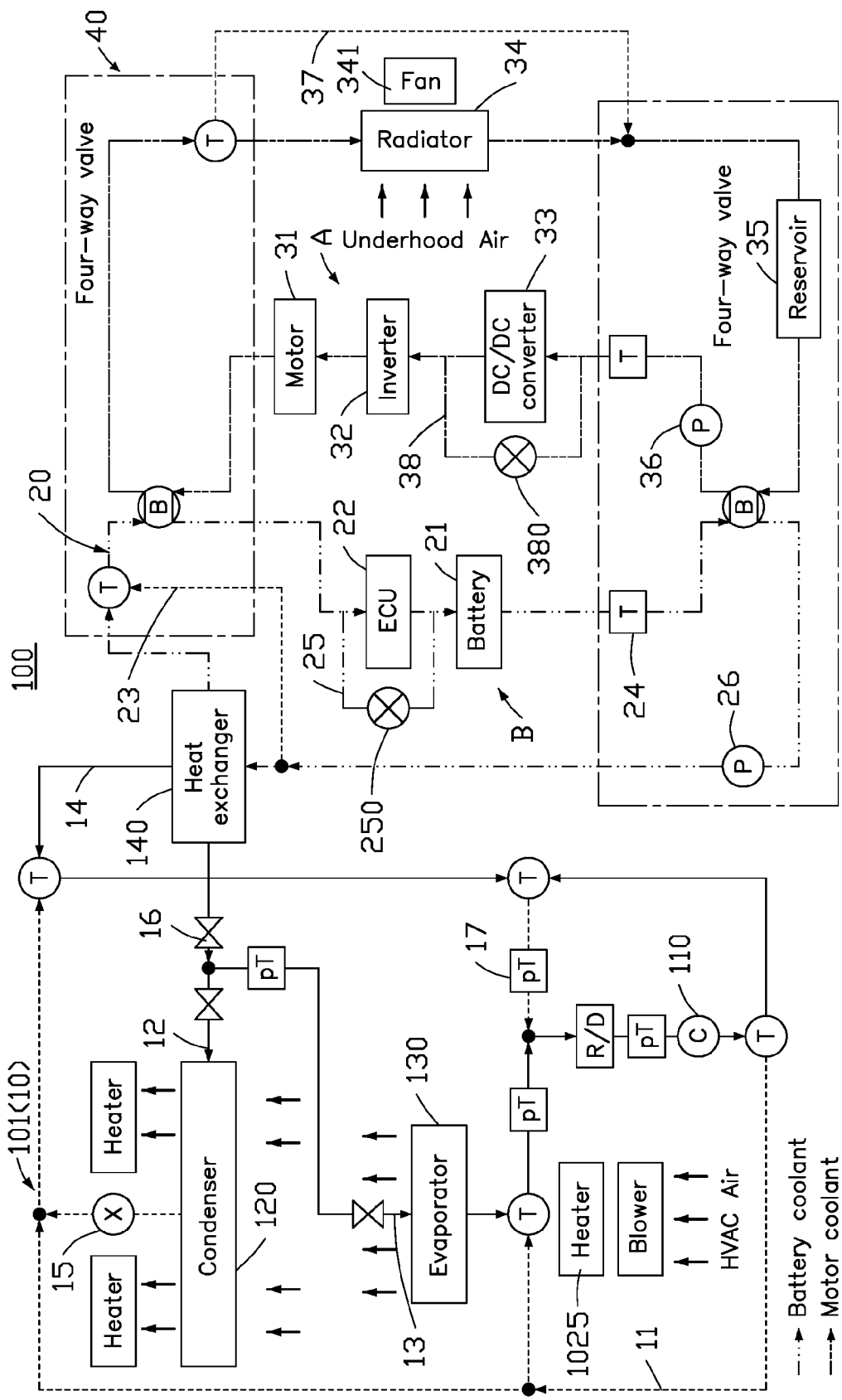
FIG. 18 is a diagrammatic view of the thermal management system of FIG. 1, operating in a first cooling mode.

The thermal management system 100 can switch to the first cooling mode at an ambient temperature higher than 20□ and lower than 50□. Referring to FIG. 18, the compressor 110, the heat exchanger 140, and the evaporator 130 successively communicate, so that the refrigerant can successively circulate in the compressor 110, the heat exchanger 140, and the evaporator 130. The compressor 110 compresses a vapor of the refrigerant with low temperature and low pressure contained within the refrigerant loop 10 into a vapor with high temperature and high pressure. The heat exchanger 140 functions as a condenser that causes the refrigerant to change phase from vapor to liquid and release heat to the ambient air. The refrigerant further changes phase from liquid to vapor after passing through the evaporator 130 and absorbs heat. The blower 1024 blows the cold air from the evaporator 130 across the passenger cabin 2. Thus, the passenger cabin 2 is cooled down. The vapor is then circulated back into the compressor 110.

Furthermore, the valve package 40 is switched to the fourth state, causing the battery coolant loop 20 and the motor coolant loop 30 to connect in parallel. The coolant is divided into two separated loops. One loop is that the coolant can successively pass through the heat exchanger 140 and the radiator 34. The other loop is that the coolant can successively pass through the motor 31, the inverter 32, the DC/DC converter 33, the battery 21, and the autopilot ECU 22. The heat from the refrigerant passing through the heat exchanger 140 can further released to the ambient environment by the radiator 34.

Second Cooling Mode

Figure 19:
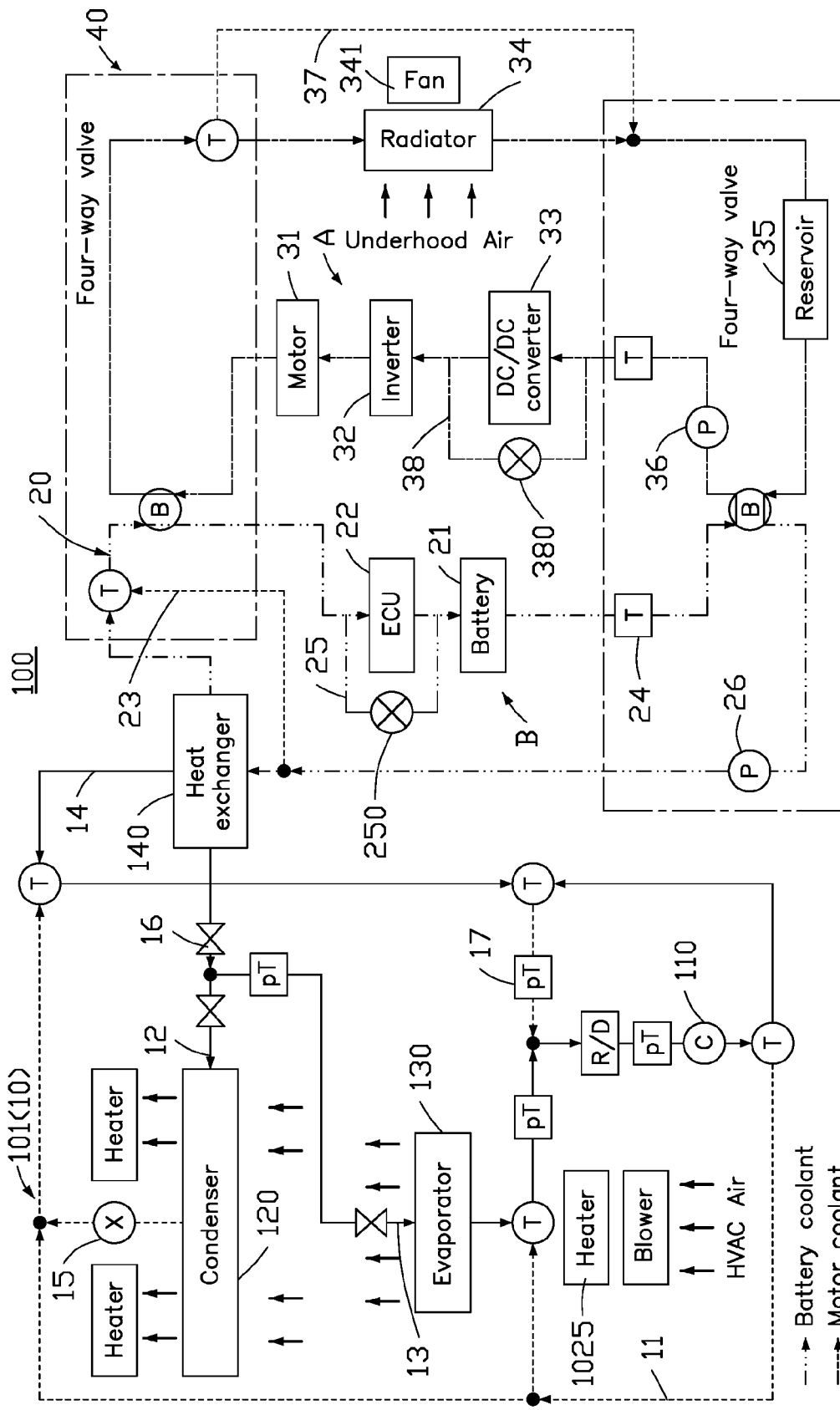
FIG. 19 is a diagrammatic view of the thermal management system of FIG. 1, operating in a second cooling mode.

The thermal management system 100 can switch to the second cooling mode at an ambient temperature higher than 20□ and lower than 50□. Referring to FIG. 19, different from the first cooling mode, the valve package 40 is switched to the second state, causing the battery coolant loop 20 and the motor coolant loop 30 to connect in series. In this case, the coolant successively passes through the heat exchanger 140, the autopilot ECU 22, the battery 21, the DC/DC converter 33, the inverter 32, the motor 31, and the radiator 34. The heat from the refrigerant passing through the heat exchanger 140 can also be released to the ambient environment by the radiator 34.

Third Cooling Mode

Figure 20A:
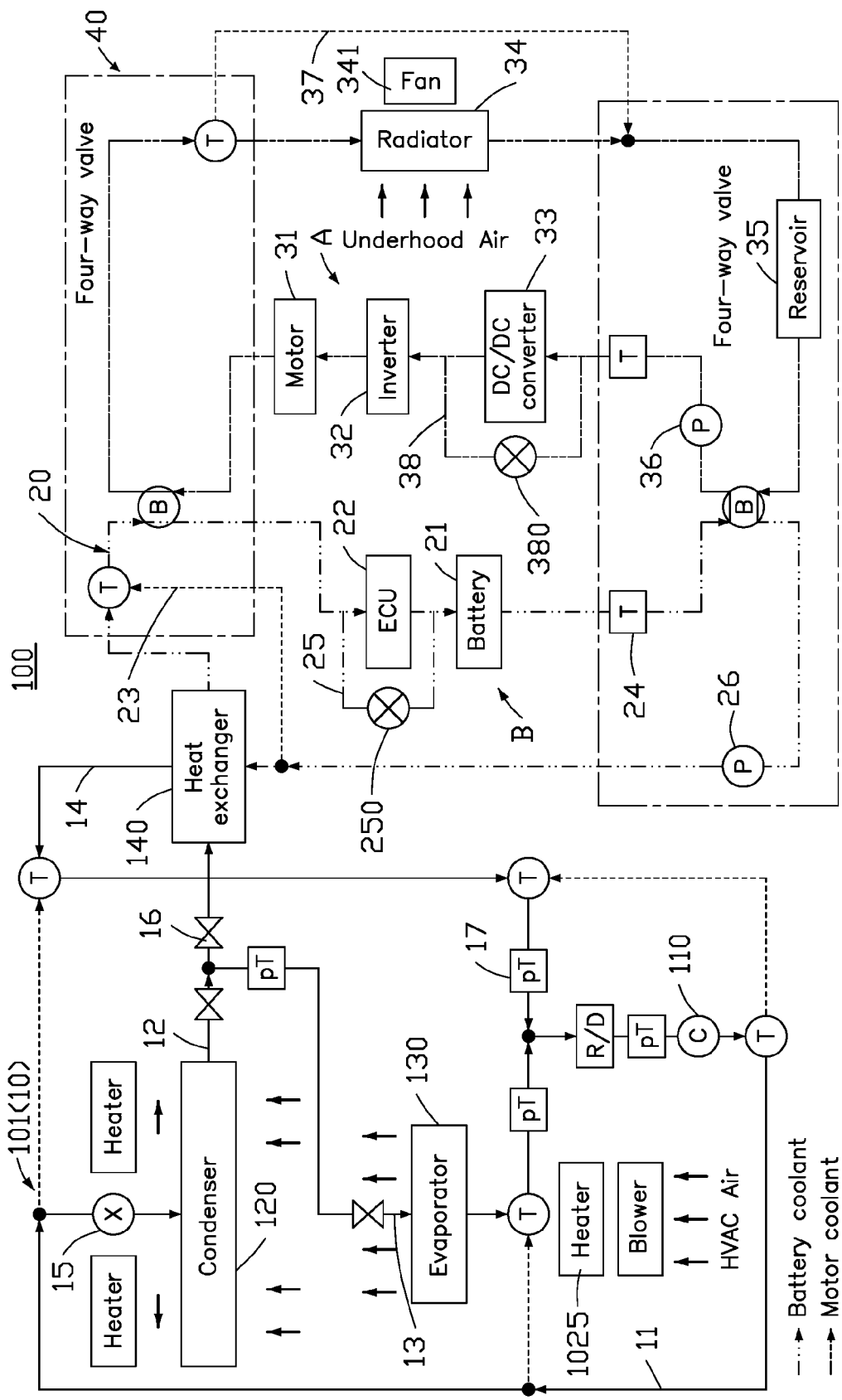
FIG. 20A is a diagrammatic view of the thermal management system of FIG. 1, operating in a third cooling mode.
Figure 20B:
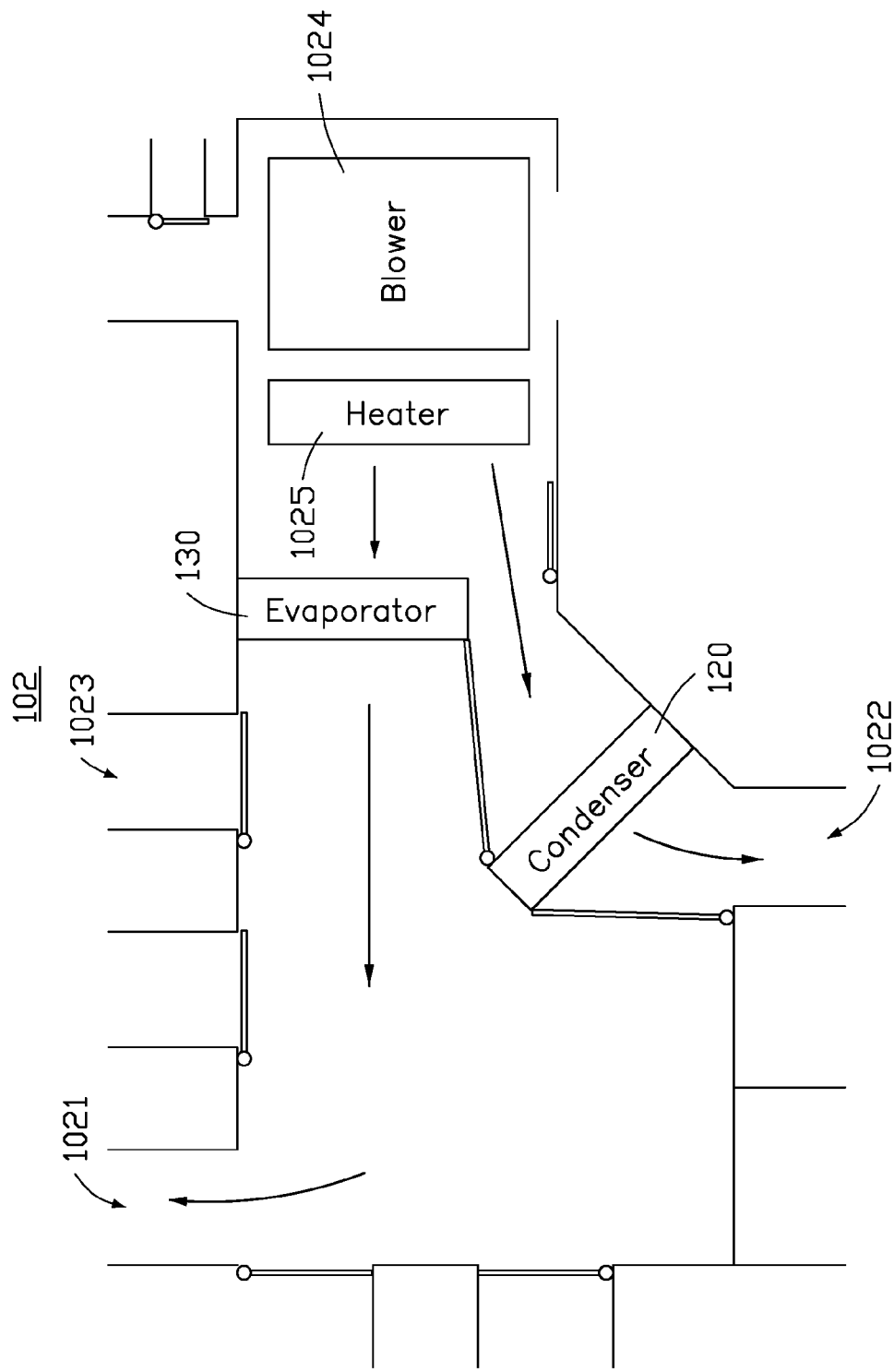
FIG. 20B is a diagrammatic view of the HVAC box of the thermal management system of FIG. 20A.

The thermal management system 100 can switch to the third cooling mode during a charging of the battery 21, at an ambient temperature higher than 10□ and lower than 50□. Referring to FIG. 20, different from the second cooling mode, the compressor 110 and the condenser 120 successively communicate, and the evaporator 130 and the heat exchanger 140 connect in parallel to the downstream end of the condenser 120. Thus, when the refrigerant successively circulates in the compressor 110 and the condenser 120, the refrigerant at the downstream end of the condenser 120 splits into two portions, one portion guiding to the evaporator 130 and the other portion guiding to the heat exchanger 140. In this case, the second air vent 1022 is opened, and the heat released by the condenser 120 is extracted to the ambient environment. That is, the condenser 120 functions as an external heat exchanger. The first air vent 1021 is opened, and the cold air from the evaporator 130 is released to the passenger cabin 2 to cool down the passenger cabin 2.

In addition, the refrigerant passing through the heat exchanger 140 also absorb the waste heat the coolant passing through the heat exchanger 140, thereby cooling down the battery 21.

Fourth Cooling Mode

Figure 21A:
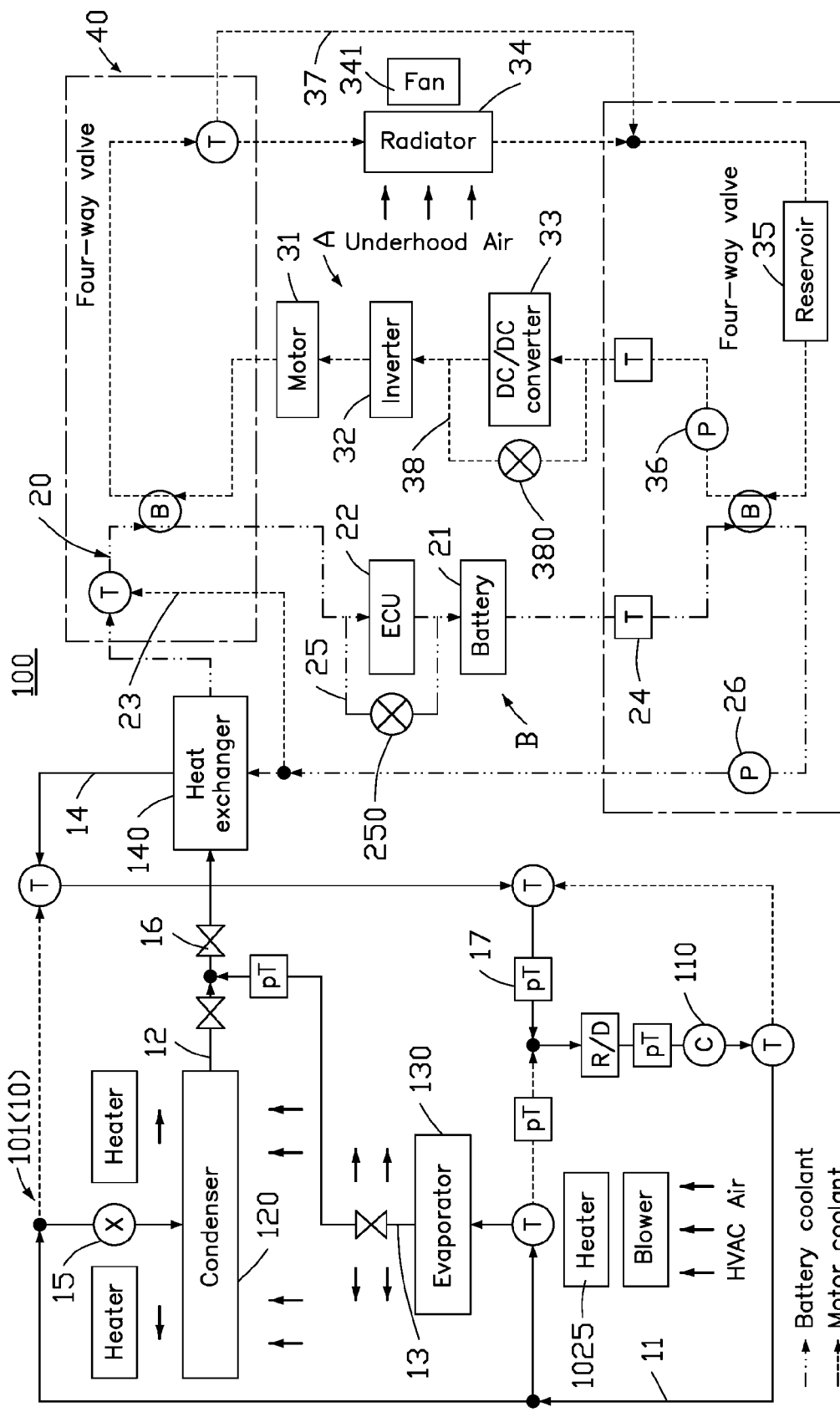
FIG. 21A is a diagrammatic view of the thermal management system of FIG. 1, operating in a fourth cooling mode.
Figure 21B:
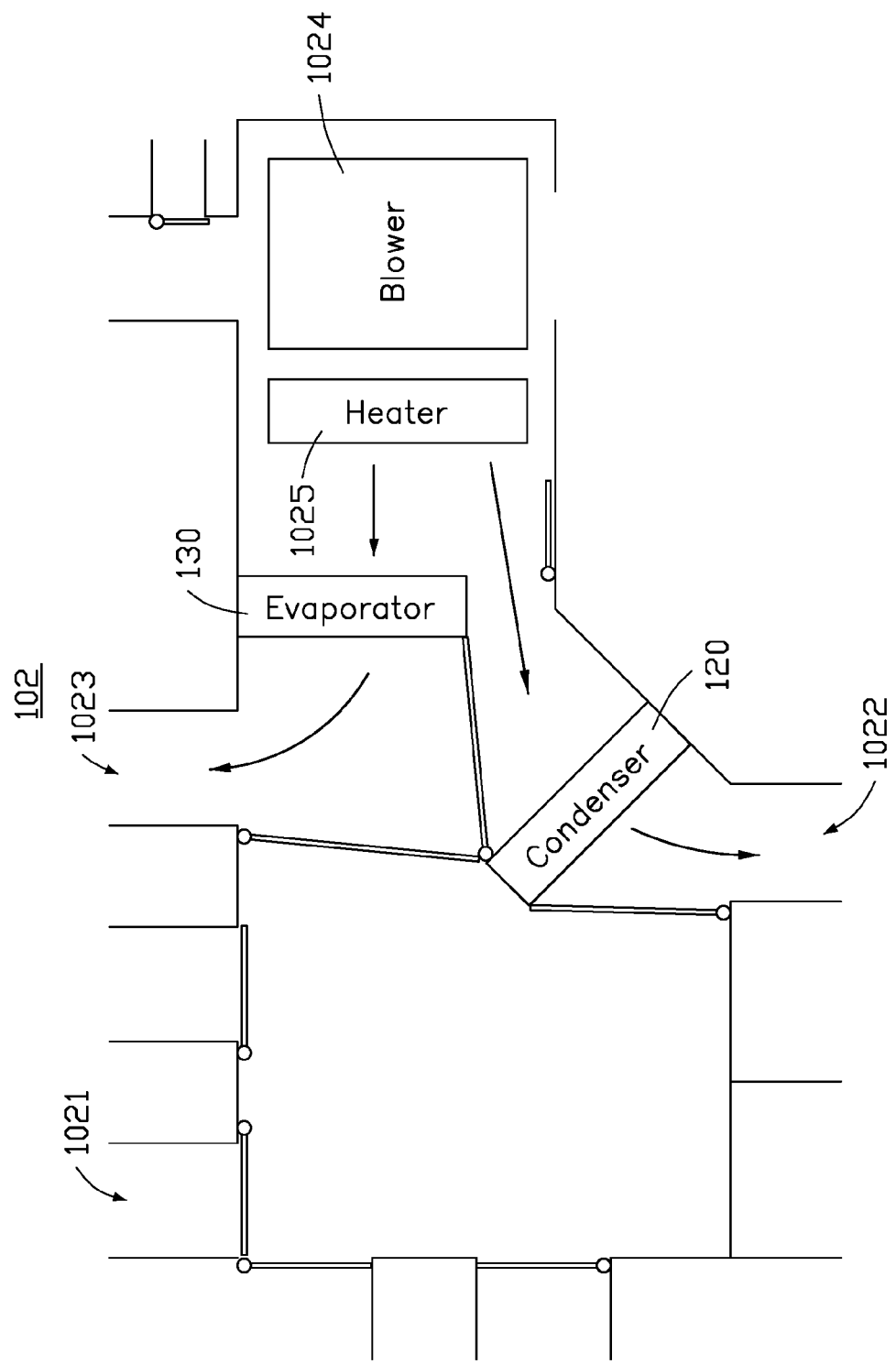
FIG. 21B is a diagrammatic view of the HVAC box of the thermal management system of FIG. 21A.

The thermal management system 100 can switch to the fourth cooling mode during a charging of the battery 210, at an ambient temperature higher than 20☐ and lower than 50☐. Referring to FIGS. 21A and 21B, the condenser 120 and the evaporator 130 connect in parallel. The compressor 110 communicates with the upstream ends of the condenser 120 and the evaporator 130. The heat exchanger 140 communicates with the downstream ends of the condenser 120 and the evaporator 130. In this case, each of the condenser 120 and the evaporator 130 functions as a condenser that causes the refrigerant to change phase from vapor to liquid and release heat. The refrigerant further changes phase from liquid to vapor after passing through the heat exchanger 140 and absorbs heat. The vapor is then circulated back into the compressor 110. The second air vent 1022s are opened, and the heat released by the condenser 120 and the evaporator 130 is extracted to the ambient environment. That is, each of the condenser 120 and the evaporator 130 functions as an external heat exchanger.

The valve package 40 is switched to the first state, causing the battery coolant loop 20 and the motor coolant loop 30 to connect in parallel. The coolant is divided into two separated loops. One loop is that the coolant can successively pass through the heat exchanger 140, the autopilot ECU 22, and the battery 21. The other loop is that the coolant can successively pass through the DC/DC converter 33, the inverter 32, the motor 31, and the radiator 34. Thus, the heat exchanger 140 can absorb the waste heat from the coolant passing through the heat exchanger 140, thereby cooling down the battery 21.

Since the refrigerant loop 10 includes two condensers operates in parallel, a faster cooling function can be achieved. Thus, the thermal management system 100 can switch to the fourth cooling mode for fast charging of the battery 21.

Besides the heating modes and the cooling modes, the thermal management system 100 can operate in a plurality of supplement modes. The working principles of the respective supplement modes will be described as follows, with reference to FIGS. 22 to 26. The solid line and the chain line in the figure represent a passage of a corresponding fluid, and a dotted line represents no fluid passage.

First Supplement Mode

Figure 22:
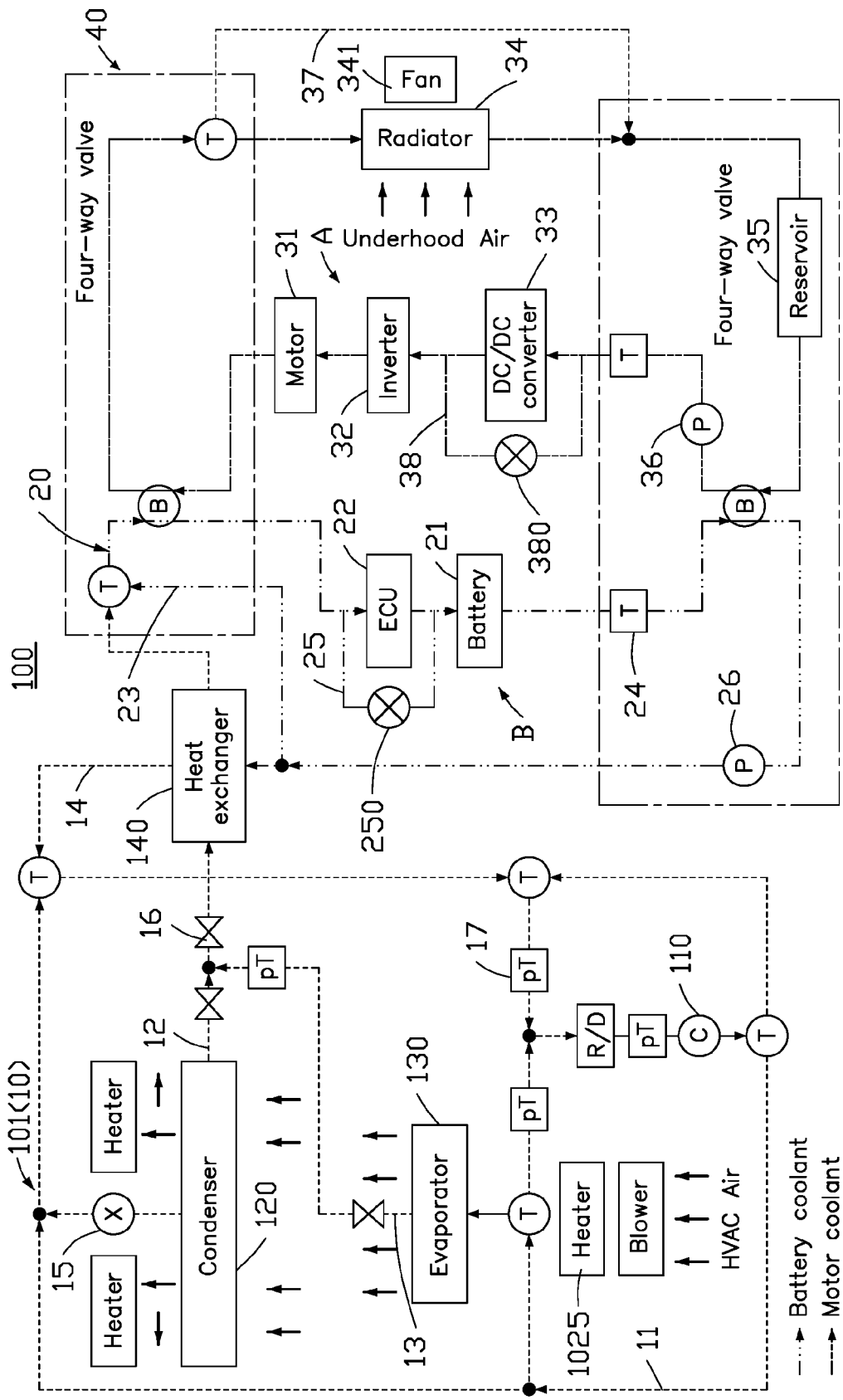
FIG. 22 is a diagrammatic view of the thermal management system of FIG. 1, operating in a first supplement mode.

The thermal management system 100 can switch to the first supplement mode at an ambient temperature higher than 5☐ and lower than 30☐. Referring to FIG. 22, the refrigerant does not circulate in the refrigerant loop 10. The valve package 40 is switched to the fifth state, causing the battery coolant loop 20 and the motor coolant loop 30 to connect in parallel. The heat exchanger 140 is bypassed, that is, the heat exchanger 140 does not exchange heat with the coolant flowing through the battery coolant loop 20. Thus, the temperature of the battery 21 becomes uniform.

Second Supplement Mode

Figure 23:
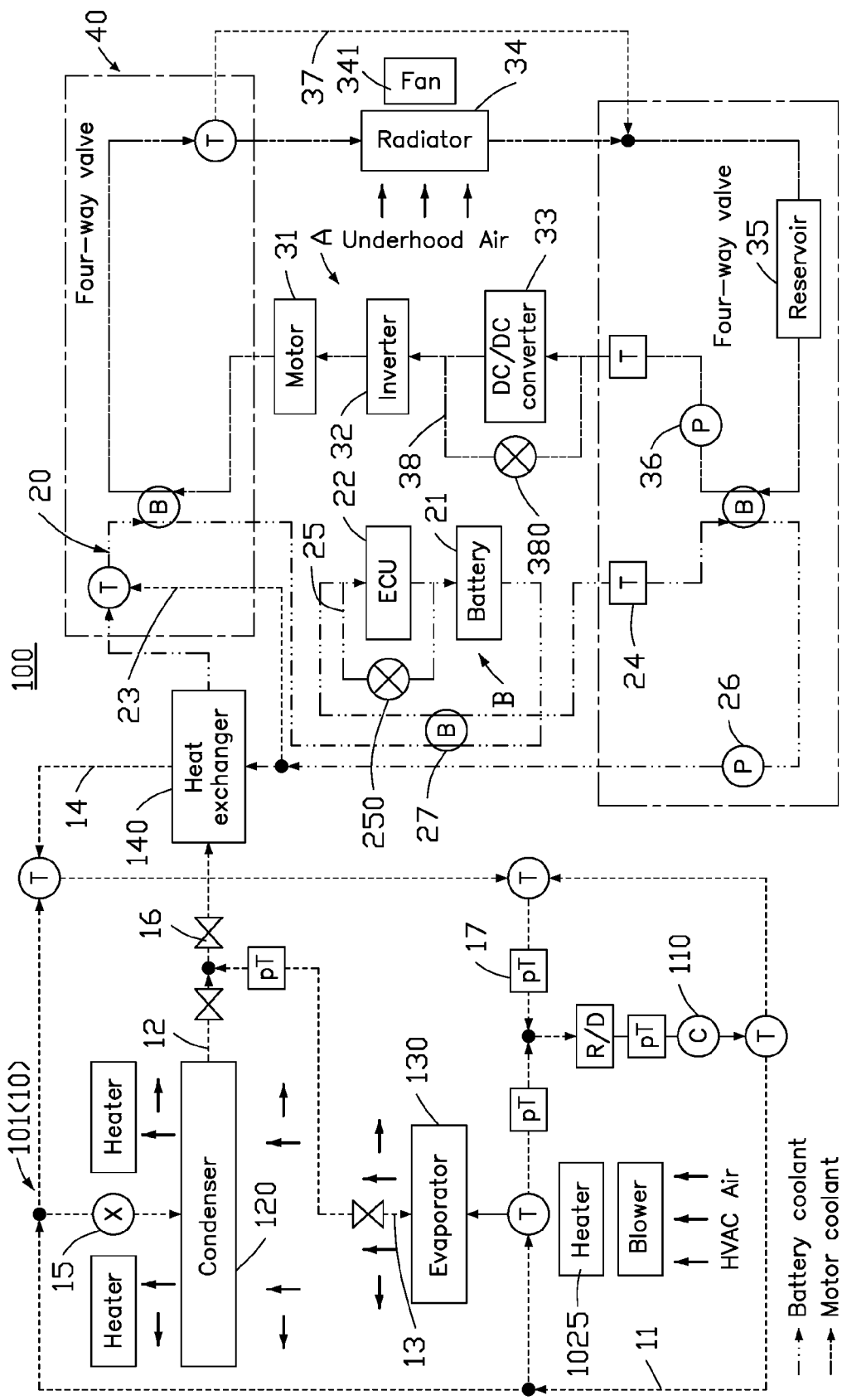
FIG. 23 is a diagrammatic view of the thermal management system of FIG. 1, operating in a second supplement mode.

The thermal management system 100 can switch to the second supplement mode at an ambient temperature higher than 5☐ and lower than 30☐. Referring to FIG. 23, different from the first supplement mode, the valve package 40 is switched to the first state, so that one loop of the coolant can successively pass through the heat exchanger 140, the autopilot ECU 22, and the battery 21. Furthermore, a two-position four-way valve 27 connects to the battery 20. The two-position four-way valve 27 can change the direction of flow of the coolant in the battery coolant loop 20, so as to make the heating or cooling rate of the battery 21 to be even. The heat exchanger 140 can exchange heat with the coolant flowing through the battery coolant loop 20.

Third Supplement Mode

Figure 24:
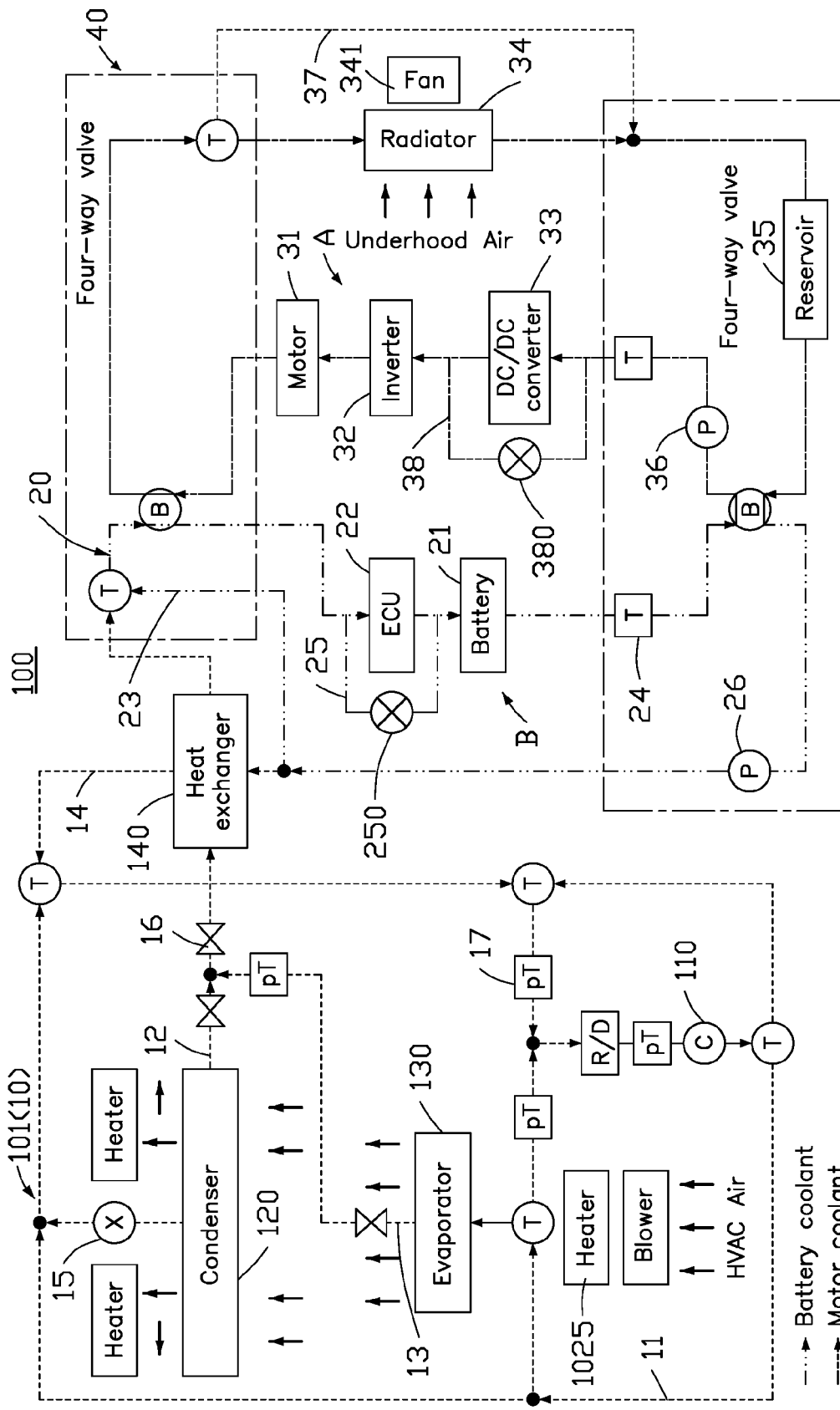
FIG. 24 is a diagrammatic view of the thermal management system of FIG. 1, operating in a third supplement mode.
Figure 25:
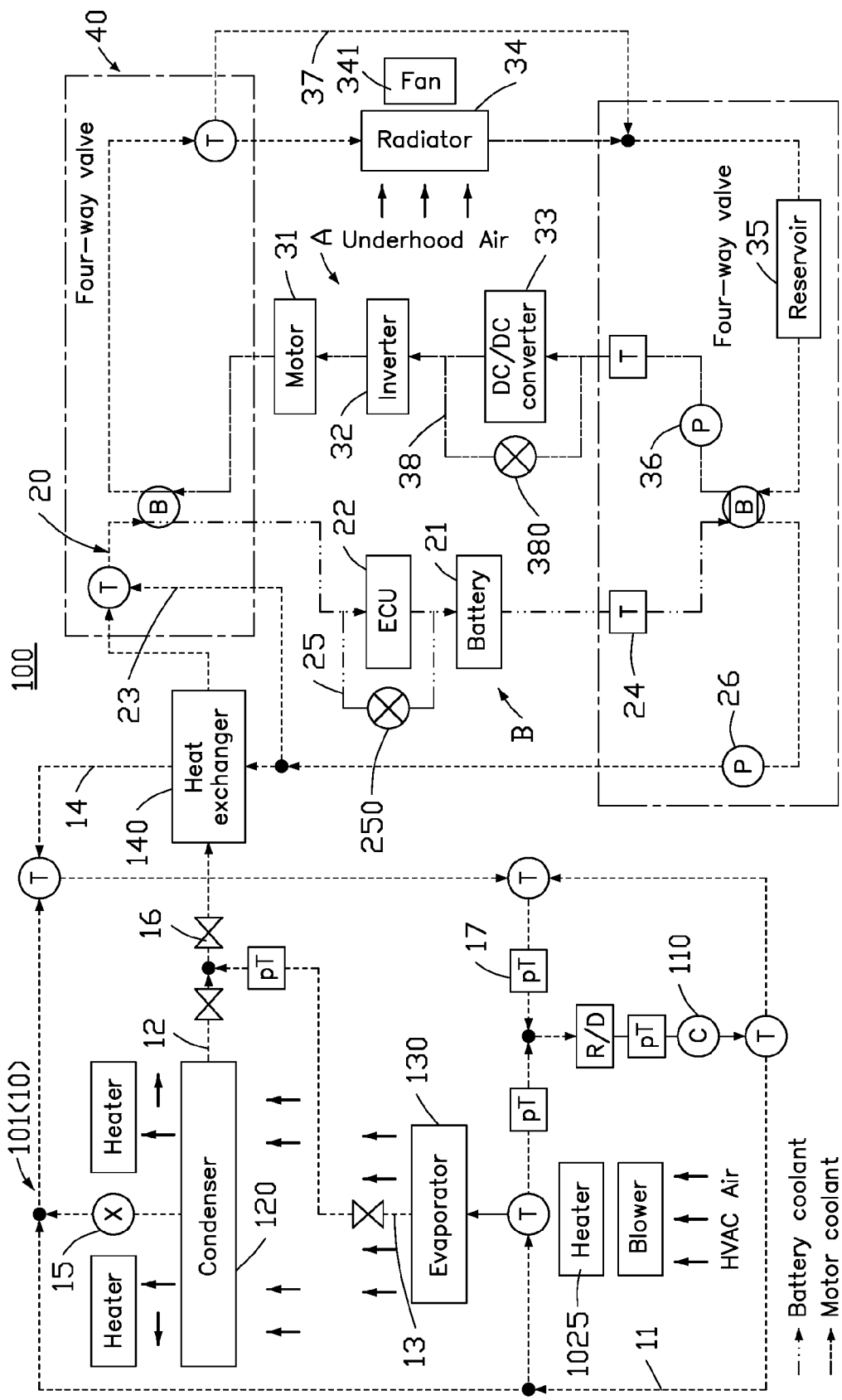
FIG. 25 is a diagrammatic view of the thermal management system of FIG. 1, operating in a fourth supplement mode.

The thermal management system 100 can switch to the third supplement mode at an ambient temperature higher than 20☐ and lower than 30☐. Referring to FIG. 24, different from the first supplement mode, the valve package 40 is switched to the sixth state, causing the battery coolant loop 20 and the motor coolant loop 30 to connect in series. In this case, the waste heat of the coolant is slowly released to the ambient environment through the radiator 34.

Fourth Supplement Mode

The thermal management system 100 can switch to the fourth supplement mode at an ambient temperature higher than 5☐ and lower than 30☐. Referring to FIG. 23, different from the first supplement mode, the valve package 40 is switched to the fourth state, causing the battery coolant loop 20 and the motor coolant loop 30 to connect in parallel. The coolant successively passes through the motor 31, the inverter 32, the DC/DC converter 33, the battery 21, and the autopilot ECU 22. No coolant successively passes through the loop including the heat exchanger 140 and the radiator 34. In this case, the battery 21 works as a heat sink to store the waste heat from the powertrain system A.

Fifth Supplement Mode

Figure 26:
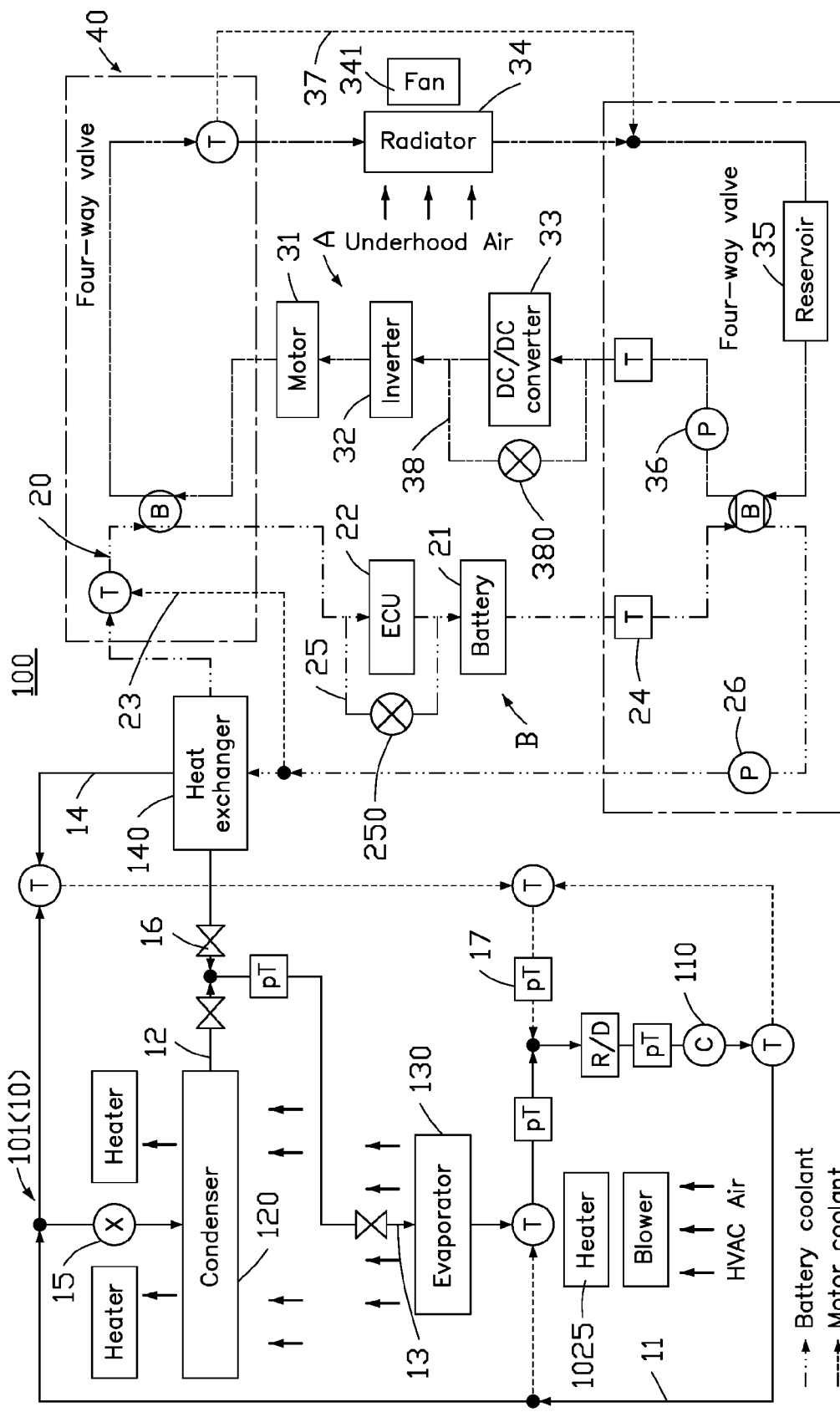
FIG. 26 is a diagrammatic view of the thermal management system of FIG. 1, operating in a fifth supplement mode.

The thermal management system 100 can switch to the fifth supplement mode at an ambient temperature higher than 15☐ and lower than 30☐. Referring to FIG. 26, the condenser 120 and the heat exchanger 140 connect in parallel. The compressor 110 communicates with the upstream ends of the condenser 120 and the heat exchanger 140. The evaporator 130 communicates with the downstream ends of the condenser 120 and the heat exchanger 140. Thus, the refrigerant at the downstream end of the compressor 110 splits into two portions, one portion guiding to the condenser 120 and the other portion guiding to the heat exchanger 140. In this case, the air in the passenger cabin 2 may change phase from vapor to liquid when passing through the evaporator 130 and then be expelled out of the passenger cabin 2, thus, the fifth supplement mode can perform dehumidification of the air in the passenger cabin 2.

Furthermore, the valve package 40 is switched to the second state, causing the battery coolant loop 20 and the motor coolant loop 30 connect in series. The heat from the heat exchanger 140 can be released to the coolant passing through the heat exchanger 140, and further released to the ambient environment through the radiator 34.

FIG. 27 illustrates an embodiment of an electric vehicle 1 including the thermal management system 100.

In cold weather, the waste heat generated by the power supply system B and the powertrain system A can be absorbed by the heat exchanger 140 to warm up the passenger cabin 2 and/or the battery 21. The heat from the ambient environment can also be absorbed by the radiator 34 to warm up the passenger cabin 2 and/or the battery 21. Thus, much less electrical energy is used to optimize the temperature of the passenger cabin 2 or the battery 21, and the driving range of the electric vehicle 1 is increased. The valve package 40 can switch among different states to change the direction of flow of the coolant in the battery coolant loop 20 and the motor coolant loop 30, thus the passenger cabin 2 and/or the battery 21 can achieve desired temperatures.

In addition, the heat exchanger 140 is multifunctional, which is also cost saving, light in weight, and small in size compared to an existing chiller. The condenser 120 and the evaporator 130 can operate in series or in parallel. The condenser 120 and the evaporator 130 operating in parallel allow for a faster heating or cooling of the passenger cabin 2.

Although the embodiments of the present disclosure have been shown and described, those having ordinary skill in the art can understand that changes may be made within the principles of the present disclosure, up to and including the full extent established by the broad general meaning of the terms used in the claims. It will, therefore, be appreciated that the embodiments described above may be modified within the scope of the claims.

What is claimed is:

1. A thermal management system usable in an electric vehicle, comprising:
    a refrigerant loop comprising a compressor, a condenser, an evaporator, and a heat exchanger, the compressor selectively communicating with at least two of the condenser, the evaporator, and the heat exchanger, thereby facilitating a refrigerant to circulate in the refrigerant loop;
    a battery coolant loop comprising a power supply system and a first bypass path connected to the heat exchanger;
    a motor coolant loop comprising a powertrain system, a radiator, and a second bypass path connected to the radiator; and
    a valve package configured for connecting the refrigerant loop, the battery coolant loop, and the motor coolant loop, the valve package comprising ten outer ports and eight inner channels, wherein three of the ten outer ports are connected to the heat exchanger, one of the three of the ten outer ports also being connected to the first bypass path, wherein two of the ten outer ports are connected to the power supply system, wherein two of the ten outer ports are connected to the powertrain system, wherein three of the ten outer ports are connected to the radiator, one of the three of the ten outer ports also being connected to the second bypass path, and wherein the valve package is arranged to allow eight of the ten outer ports to selectively communicate with four of the eight inner channels, thereby facilitating a coolant to circulate in the battery coolant loop and the motor coolant loop.

2. The thermal management system of claim 1, wherein the valve package is an octovalve.

3. The thermal management system of claim 1, wherein the valve package comprises two four-way valves.

4. The thermal management system of claim 1, further comprising:
    an HVAC box, the condenser and the evaporator being disposed in the HVAC box, wherein the HVAC box defines a first air vent, a second air vent, and a third air vent, the first air vent is configured to communicate the condenser with a passenger cabin of the vehicle, the second air vent is configured to communicate the condenser with an ambient environment, the third air vent is configured to communicate the evaporator with the ambient environment.

5. The thermal management system of claim 4, wherein the compressor, the condenser, and the heat exchanger successively communicate, the first air vent communicates the condenser with the passenger cabin; and
    the valve package is arranged to cause the battery coolant loop and the motor coolant loop to connect in series, bypassing the radiator.

6. The thermal management system of claim 5, wherein the HVAC box further comprises a blower to blow warm air from the condenser across the passenger cabin.

7. The thermal management system of claim 5, wherein the HVAC box further comprises at least one heater disposed in in front of the blower or the condenser.

8. The thermal management system of claim 4, wherein the compressor, the condenser, and the heat exchanger successively communicate, the first air vent communicates the condenser with the passenger cabin; and
    the valve package is arranged to cause the battery coolant loop and the motor coolant loop to connect in parallel.

9. The thermal management system of claim 8, wherein one or more fans are positioned in front of the radiator.

10. The thermal management system of claim 4, wherein the compressor, the condenser, and the evaporator successively communicate, the first air vent communicates the condenser with the passenger cabin; and
    the valve package is arranged to cause the battery coolant loop and the motor coolant loop to connect in parallel.

11. The thermal management system of claim 4, wherein the compressor and the condenser communicate, the evaporator and the heat exchanger connect in parallel to a downstream end of the condenser, the first air vent communicates the condenser to the passenger cabin, the third air vent communicates the evaporator and the ambient environment; and
    the valve package is arranged to cause the battery coolant loop and the motor coolant loop to connect in series, bypassing the radiator.

12. The thermal management system of claim 4, wherein the compressor and the condenser communicate, the evaporator and the heat exchanger connect in parallel to a downstream end of the condenser, the first air vent communicate the condenser with the passenger cabin, and an air path is formed between the HVAC box and the passenger cabin; and
    the valve package is arranged to cause the battery coolant loop and the motor coolant loop to connect in series, bypassing the radiator.

13. The thermal management system of claim 4, wherein the condenser and the heat exchanger connect in parallel, the compressor communicates with upstream ends of the condenser and the heat exchanger, the evaporator communicates with downstream ends of the condenser and the heat exchanger; the first air vent communicates the condenser with the passenger cabin, the third air vent communicates the evaporator with the ambient environment; and
    the valve package is arranged to cause the battery coolant loop and the motor coolant loop to connect in series, bypassing the radiator.

14. The thermal management system of claim 4, wherein the compressor, the heat exchanger, and the evaporator successively communicate; the third air vent communicates the evaporator with the ambient environment; and
    the valve package is arranged to cause the battery coolant loop and the motor coolant loop to connect in parallel, bypassing the radiator.

15. The thermal management system of claim 4, wherein the evaporator and the condenser connect in parallel, the heat exchanger communicates with upstream ends of the evaporator and the condenser, each of the condenser and the evaporator functions as an evaporator; the second air vent and the third air vent respectively communicate the condenser and the evaporator with the ambient environment; and the valve package is arranged to cause the battery coolant loop and the motor coolant loop to connect in parallel.

16. The thermal management system of claim 4, wherein the compressor, the heat exchanger, and the evaporator successively communicate, the first air vent communicates the evaporator with the passenger cabin; and the valve package is arranged to cause the battery coolant loop and the motor coolant loop to connect in series.

17. The thermal management system of claim 4, wherein the compressor and the condenser successively communicate, the evaporator and the heat exchanger connect in parallel at a downstream end of the condenser; the first air vent communicates the evaporator with the passenger cabin, the second air vent communicates the condenser with the ambient environment; and the valve package is arranged to cause the battery coolant loop and the motor coolant loop to connect in series.

18. The thermal management system of claim 1, wherein the battery coolant loop comprises a battery and an autopilot electronic control unit, the battery coolant loop is configured to circulate the coolant through the battery and the autopilot electronic control unit; and the motor coolant loop comprises a motor, an inverter, a DC/DC converter, the motor coolant loop is configured to circulate the coolant through the motor, the inverter, the DC/DC converter.

19. The thermal management system of claim 18, wherein the motor coolant loop further comprises a third bypass path connected to DC/DC converter, the third bypass path comprises a shut-off valve operable between open and close to allow the coolant to pass through or bypass the DC/DC converter; and the battery coolant loop further comprises a third bypass path connected to the autopilot electronic control unit, the third bypass path comprises a shut-off valve operable between open and close to allow the coolant to pass through or bypass the autopilot electronic control unit.

20. An electric vehicle comprising:
a passenger cabin; and
a thermal management system comprising:
  a refrigerant loop comprising a compressor, a condenser, an evaporator, and a heat exchanger, the compressor selectively communicating with at least two of the condenser, the evaporator, and the heat exchanger, thereby facilitating a refrigerant to circulate in the refrigerant loop;
  a battery coolant loop comprising a power supply system and a first bypass path connected to the heat exchanger;
  a motor coolant loop comprising a powertrain system, a radiator, and a second bypass path connected to the radiator; and
  a valve package configured for connecting the refrigerant loop, the battery coolant loop, and the motor coolant loop, the valve package comprising ten outer ports and eight inner channels, wherein three of the ten outer ports are connected to the heat exchanger, one of the three of the ten outer ports also being connected to the first bypass path, wherein two of the ten outer ports are connected to the power supply system, wherein two of the ten outer ports are connected to the powertrain system, wherein three of the ten outer ports are connected to the radiator, one of the three of the ten outer ports also being connected to the second bypass path, and wherein the valve package is arranged to allow eight of the ten outer ports to selectively communicate with four of the eight inner channels, thereby facilitating a coolant to circulate in the battery coolant loop and the motor coolant loop.

* * * * *